United States Patent
Lindenstruth

(12) 
(10) Patent No.: US 8,589,030 B2
(45) Date of Patent: *__Nov. 19, 2013__

(54) LEARNING CONTROLLER FOR THE COMPENSATION OF TORQUE PULSATIONS IN A STEERING ASSEMBLY

(75) Inventor: Michael Lindenstruth, Groβ-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/704,201

(22) Filed: Feb. 11, 2010

(65) Prior Publication Data

US 2010/0211263 A1     Aug. 19, 2010

(30) Foreign Application Priority Data

Feb. 13, 2009   (GB) .................................. 0902371.4

(51) Int. Cl.
  *B62D 6/00*     (2006.01)
  *B62D 5/04*     (2006.01)

(52) U.S. Cl.
  USPC .......................................... 701/42; 180/446

(58) Field of Classification Search
  USPC ................. 701/41–43; 180/422, 446
  See application file for complete search history.

(56) References Cited

U.S. PATENT DOCUMENTS

| | | | | |
|---|---|---|---|---|
| 4,683,590 A * | 7/1987 | Miyoshi et al. | ............ | 381/71.12 |
| 4,992,944 A * | 2/1991 | Noto et al. | ...................... | 701/41 |
| 5,371,451 A * | 12/1994 | Toyosawa et al. | ....... | 318/568.13 |
| 5,919,241 A | 7/1999 | Bolourchi et al. | | |
| 6,122,579 A * | 9/2000 | Collier-Hallman et al. | .... | 701/41 |
| 6,370,459 B1 * | 4/2002 | Phillips | .......................... | 701/41 |
| 6,658,335 B2 * | 12/2003 | Kleinau | .......................... | 701/41 |
| 6,694,239 B1 | 2/2004 | Yao et al. | | |
| 7,574,294 B2 * | 8/2009 | Ta et al. | .......................... | 701/41 |
| 8,116,944 B2 * | 2/2012 | Hales et al. | ..................... | 701/41 |
| 2003/0052639 A1 | 3/2003 | Tanaka et al. | | |
| 2003/0055544 A1 | 3/2003 | Amberkar | | |
| 2004/0148080 A1 * | 7/2004 | Ekmark et al. | ................... | 701/41 |

(Continued)

FOREIGN PATENT DOCUMENTS

| | | |
|---|---|---|
| EP | 1759956 A1 | 3/2007 |
| EP | 2030868 A1 * | 3/2009 |

(Continued)

OTHER PUBLICATIONS

JPO machine translation of JP 2002-249058.*

(Continued)

*Primary Examiner* — James Trammell
*Assistant Examiner* — David Testardi
(74) *Attorney, Agent, or Firm* — Ingrassia Fisher & Lorenz, P.C.

(57) ABSTRACT

A control device for controlling an electric steering assembly is provided to reduce torque pulsations in the steering assembly. The control device comprises a learning control device for the suppression of periodic disturbances in a steering assembly. The learning control device is referred to as POISON (periodic on-line iterative signal optimum navigation) controller. By iterative learning of a corrected reference signal the POISON controller is able to compensate for control errors which occur in conventional closed loop control systems. The POISON controller is capable of permanent online operation. Therefore it is able to compensate for certain changes in the controlled system. The POISON controller can easily be added to existing power steering control loops.

14 Claims, 13 Drawing Sheets

(56) References Cited

U.S. PATENT DOCUMENTS

| | | |
|---|---|---|
| 2005/0273235 A1* | 12/2005 | Ohta et al. .................. 701/41 |
| 2007/0192005 A1* | 8/2007 | Ishikawa et al. ............. 701/41 |
| 2011/0125450 A1* | 5/2011 | Lindenstruth ............... 702/113 |

FOREIGN PATENT DOCUMENTS

| | | | |
|---|---|---|---|
| JP | 09072375 A | * | 3/1997 |
| JP | 2002249058 A | * | 9/2002 |
| JP | 2004189028 A | * | 7/2004 |

OTHER PUBLICATIONS

JPO machine translation of JP 2002-249058 (original JP document published Sep. 3, 2002).*

UKIPO, British Search Report for Application No. 0902371.4, dated May 13, 2009.

UKIPO, British Examination Report for Application No. 09020371.4, dated Nov. 9, 2012.

* cited by examiner

LEARNING CONTROLLER FOR THE COMPENSATION OF TORQUE PULSATIONS IN A STEERING ASSEMBLY

CROSS-REFERENCE TO RELATED APPLICATION

This application claims priority to British Patent Application No. 0902371.4, filed Feb. 13, 2009, which is incorporated herein by reference in its entirety.

TECHNICAL FIELD

The present application relates to a controller for reducing torque pulsations in a steering assembly of an automobile. The present application also relates to a control method for reducing torque pulsations in a steering assembly of an automobile.

BACKGROUND

Conventional steering of a wheeled motor vehicle is typically achieved by the vehicle operator (driver) rotating a steering wheel that is arranged in the passenger compartment of the vehicle to turn the steerable road wheels. Conventional steering systems generally include a rack and pinion type steering assembly operatively coupled to the road wheels and a steering column coupled between the steering wheel and the rack and pinion assembly for converting angular rotation of the steering wheel into a sliding motion on the rack to effect steering operation of the road wheels.

In order to reduce the amount of driver effort that is required to rotate the steering wheel conventional steering systems typically include a power assisted force actuator that assists the operator with rotation of the steering wheel to overcome opposing forces such as road load forces on the road wheels and friction forces in the steering assembly. The amount of power assistance generally varies depending on the speed of the vehicle and the amount of effort applied by the driver to the steering wheel. Herein, the term "steering assembly" refers to the mechanical parts of the steering equipment whereas the term "steering system" also includes controlling equipment, if present.

Conventional power steering systems typically employ either hydraulic power assist or electric power assist. In contrast to hydraulic power assist systems, the electric power steering system offers variable assist capabilities, more efficient energy consumption, reduced mechanism complexity, increased reliability, and responsive on-demand steering assist, as well as other advantages.

The electric power steering (EPS) system employs an electric motor for applying a controlled amount of torque to the steering assembly to assist the driver in turning the steering wheel. The conventional electric power steering system is generally configured with a feedback control system that electrically amplifies the driver's steering torque input to the steering system to realize improved steering comfort and performance. The electric power steering system typically includes a rotatable steering wheel, a steering shaft, a rack and pinion assembly, a gear box assembly, and an electric motor.

The torque to the steering assembly includes of the driver's input torque as well as of a feedback torque which is due to external influences such as wheel imbalances, wheel to road interactions, the mechanical parts of the steering assembly or irregularities in the response of the electric motor. Whereas the feedback of the wheel to road interaction to the driver is usually desirable, the other contributions may affect the riding comfort and security. It is therefore advantageous to provide active or passive damping facilities to reduce undesired components of the torque feedback. In particular, a controller for the electric motor may be used for the implementation of an active vibration suppression functionality.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or the following detailed description. In the following description, details are provided to describe the embodiments of the application (invention). It shall be apparent to one skilled in the art, however, that the embodiments may be practiced without such details.

Figure 1:
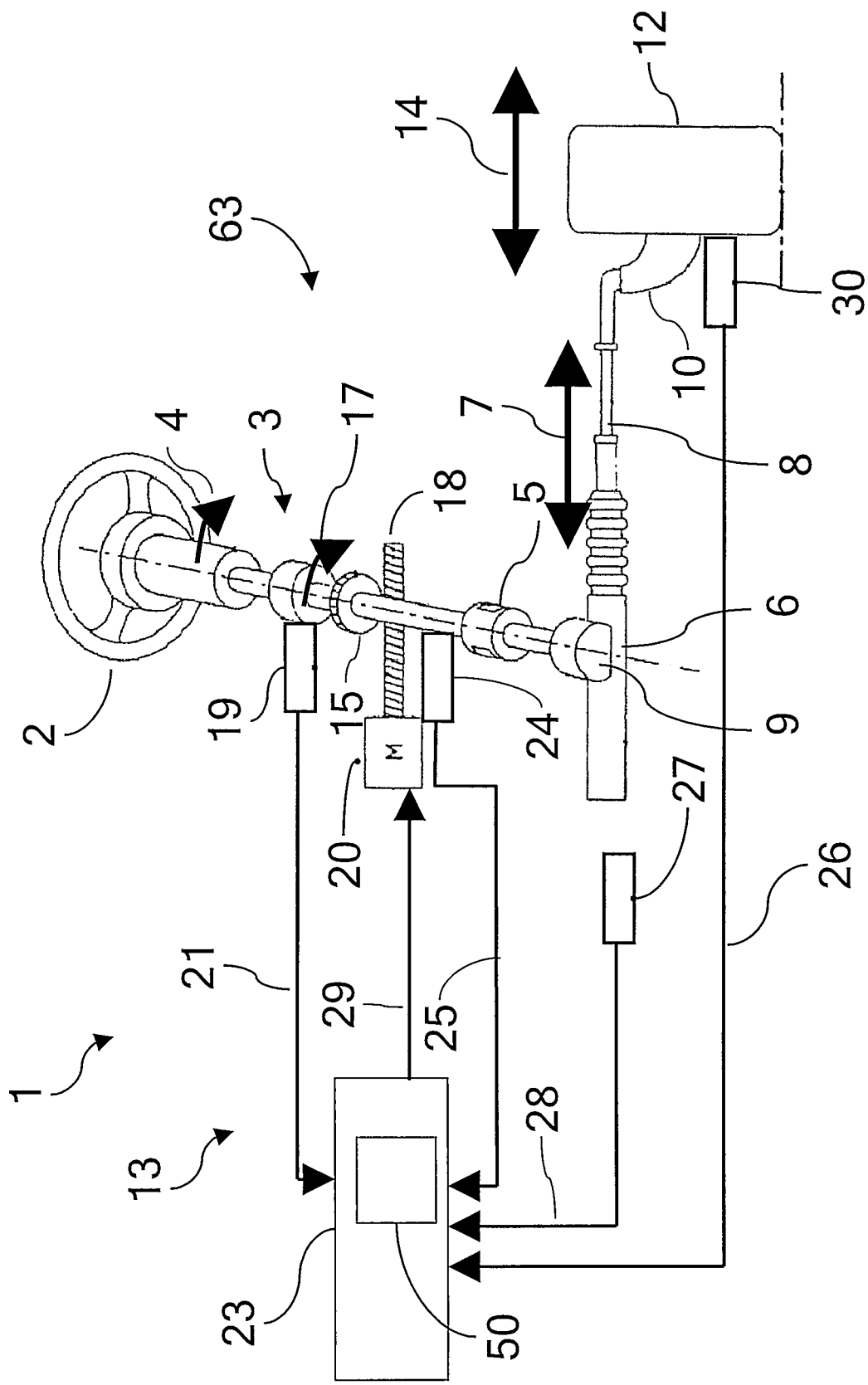
FIG. 1 illustrates a steering system.

FIG. 1 shows a steering system 1 for a car. In the steering system 1, a steering wheel 2 is connected to a steering shaft 3. At its lower end, the steering shaft is connected to a steering gear 9. A cardan joint 5 is provided above the steering gear 9 at the lower end of the steering shaft 3. Steering shaft 3 is rotatable around its axis. The rotation of the steering shaft is indicated by an arrow 4.

A steering rack 6 is mounted at the lower end of the steering shaft 3 in such a manner that it is movable in a horizontal direction. The possible horizontal movement of the steering rack 6 is indicated by an arrow 7. Mounting elements of the steering rack 6 are not shown in FIG. 1.

The lower end of the steering shaft 3 is connected to the steering rack 6 via a rack and pinion steering gear arrangement. The steering gear 9 comprises a pinion, which is provided at the lower end of the steering shaft 3, and teeth which are provided on an upper surface of the steering rack 6. The teeth mesh with teeth of the pinion. Details of the steering gear 9 and the teeth on the surface of the steering rack 6 are not shown in FIG. 1.

On the left side of the steering rack 6 a left tie rod 8 is provided. The inner end of the left tie rod 8 is attached to the steering rack 6 via a left ball joint. A left steering knuckle 10 is attached to outer ends of the left tie rod 8. A left wheel 12 with tire is journaled on the left steering knuckle 10. On the right side, the steering rack 6 is connected to a right wheel in the same way as shown in FIG. 1 for the left side. A possible sideward movement of the left wheel 12 is indicated by an arrow 14.

An electromechanical servo steering 13 is provided at the steering shaft of the steering system 1. A torsion bar, which is not shown in FIG. 1, is integrated into the steering shaft 3. At the lower end of the torsion bar, a pinion 15 is provided. A worm 18 is mechanically connected with an electric motor 20. Teeth of the pinion 15 mesh with teeth of the worm 18. A rotational movement of the pinion 15 is indicated by an arrow 17.

A torque sensor 19 is provided at the torsion bar. The torque sensor 19 is an angle sensor for measuring the twisting angle of the torsion bar. An output of the torque sensor 19 is connected to an input of a control device 23 via an input cable 21. An angle sensor 24 is provided at the lower part of the steering shaft 3. The angle sensor 24 is an angle sensor for measuring the rotation angle of the lower part of the steering shaft. An output of the angle sensor 24 is connected to an input of the control device 23 via an input cable 25. An acceleration sensor 27 is provided at a suspension arm of the wheel suspension. An output of the acceleration sensor is connected to an input of the control device 23 via an input cable 28. An output of the control device 23 is connected to an input of the electric motor 20 via a control cable 29.

An angle sensor 30 is provided at the left steering knuckle 10. The angle sensor 30 is connected to an input of the control device 23 via an input cable 26.

Within the control device, a POISON controller is provided. The POISON controller 50 comprises adaptive and iterative learning control components that enable the POISON controller 50 to provide an improved quality of controlling or responding to periodic signals. The acronym "POISON" stands for "Periodic Online Iterative Signal Optimum Navigation".

An active vibration damping can take over the function of conventional mechanical low-pass filtering and dampers. As a consequence, the mass of the car can be reduced.

The POISON controller is able to compensate wheel imbalances as well as other periodic vibrations during a steering process. The vibration compensation enhances the riding comfort as the driver will not be disturbed by a dying part or component. The vibration compensation also extends the lifespan of the components as it reduces the amplitude of the vibrations.

By supervising and analyzing the controller signals an early diagnosis of imminent failures can be performed The POISON Controller can be easily added to existing systems. As the POISON controller is used in addition to an existing controller it can also be easily disconnected or temporarily switched off. Switching the POISON controller off is advantageous in situations when the action of the POISON controller is not desired, for example while driving through rough terrain or during parking of the car.

The operation of the steering system 1 is now explained with reference to FIG. 1. When a driver turns the steering wheel 2, the rotational motion is transferred to the upper part of the steering shaft 3. The rotation of the upper of the steering shaft 3 bends the torsion bar which is integrated in the steering shaft 3. The torque sensor 19 measures the twisting angle of the torsion bar and sends an actual angle signal to the control device 23. From the actual angle signal, the control device 23 computes a corresponding torque.

At the same time, the torque is transferred from the torsion bar to the lower part of the steering shaft 3. Stoppers, which are also not shown in FIG. 1, limit the twisting angle of the torsion bar.

The rotation of the lower part of the steering shaft 3 moves the pinion at the lower end of the steering shaft 3. The movement of the pinion moves the steering rack 6 in a horizontal direction which is indicated by arrow 7. The steering rack 6 transfers its horizontal motion via the ball joints, which are not shown in FIG. 1, to the left steering rod 8. The steering rod 8 moves the steering knuckle which turns the wheel 12.

The rotational axis of the wheel moves in a horizontal plane. This movement is indicated by the arrow 14. The movement of the wheel rotation axis is due to the torque provided by the steering assembly. It also depends on the interaction with the road as well as on wheel imbalances and on forces transferred from the car suspension and the braking mechanism. In particular the mass imbalances of the wheel lead to periodical disturbances which have the periodicity of the wheel rotation.

During operation of the steering system, the angle sensor 24 provides an actual angle signal of the turning angle of the lower part of the steering shaft 3. The angle sensor 30 provides an actual angle signal of the wheel rotation angle of the left wheel 12. The torque sensor 19 provides an actual angle signal of the twisting angle of the torsion bar. The acceleration sensor 27 provides an actual acceleration value of the horizontal acceleration of a wheel.

The actual value signals of the sensors 19, 24, 27, 30 are transmitted to the control device 23 via input cables 21, 25, 28 and 26, respectively. The control device 23 uses the POISON controller 50 to derive a control signal for the electric motor 20. The control signal for the electric motor 20 is sent to a current control device which is not shown in FIG. 1. The current control device generates a motor current from the control signal and transmits the motor current to the electric motor 20 via the control cable 29.

Figure 2:
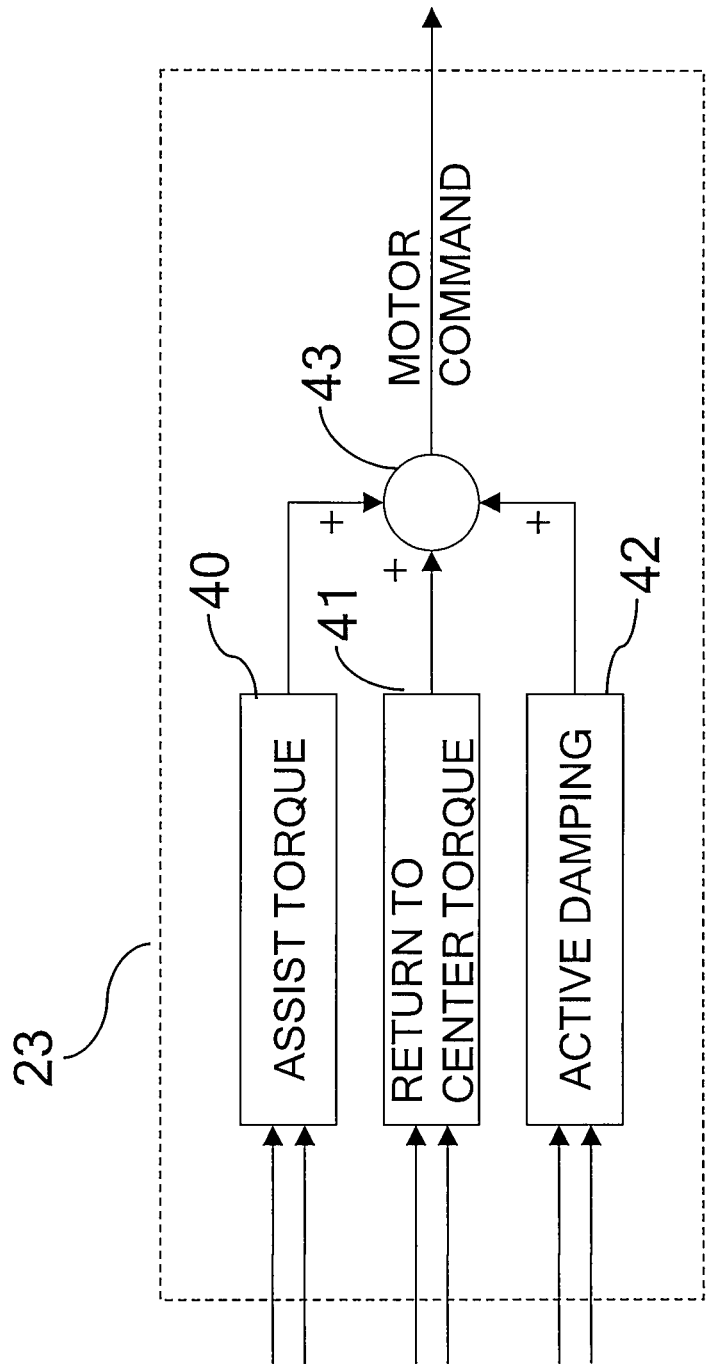
FIG. 2 illustrates an internal composition of a steering control device.

FIG. 2 gives a more detailed explanation of the internal composition of the control device 23. The control device 23 has several functional units for performing several functions. It comprises a gain unit 40 which enhances the steering torque that is transmitted from the steering wheel 2 to the torsion bar by a gain factor. The gain factor depends on the twisting angle of the torsion bar. The gain factor also depends on the velocity of the car. Usually, higher gains are desired for low velocities, for example during parking and lower gains for high velocities.

Furthermore, the control device comprises a zero angle unit 41. The zero angle unit 41 generates a control signal for returning the wheels to center position when the driver applies no torque at the driving wheel.

Furthermore, the control device 23 comprises an active damping unit 42. The active damping unit 42 generates a control signal for the suppression of disturbances. The POISON controller 50 of FIG. 1 is contained in the active damping unit.

The units 40, 41, 42 receive reference signals and actual value signals via their inputs. The incoming signals are symbolized by the arrows to the left of the units 40, 41, 42. Outputs of the units 40, 41, 42 are connected to inputs of an adder 43.

Figure 3:
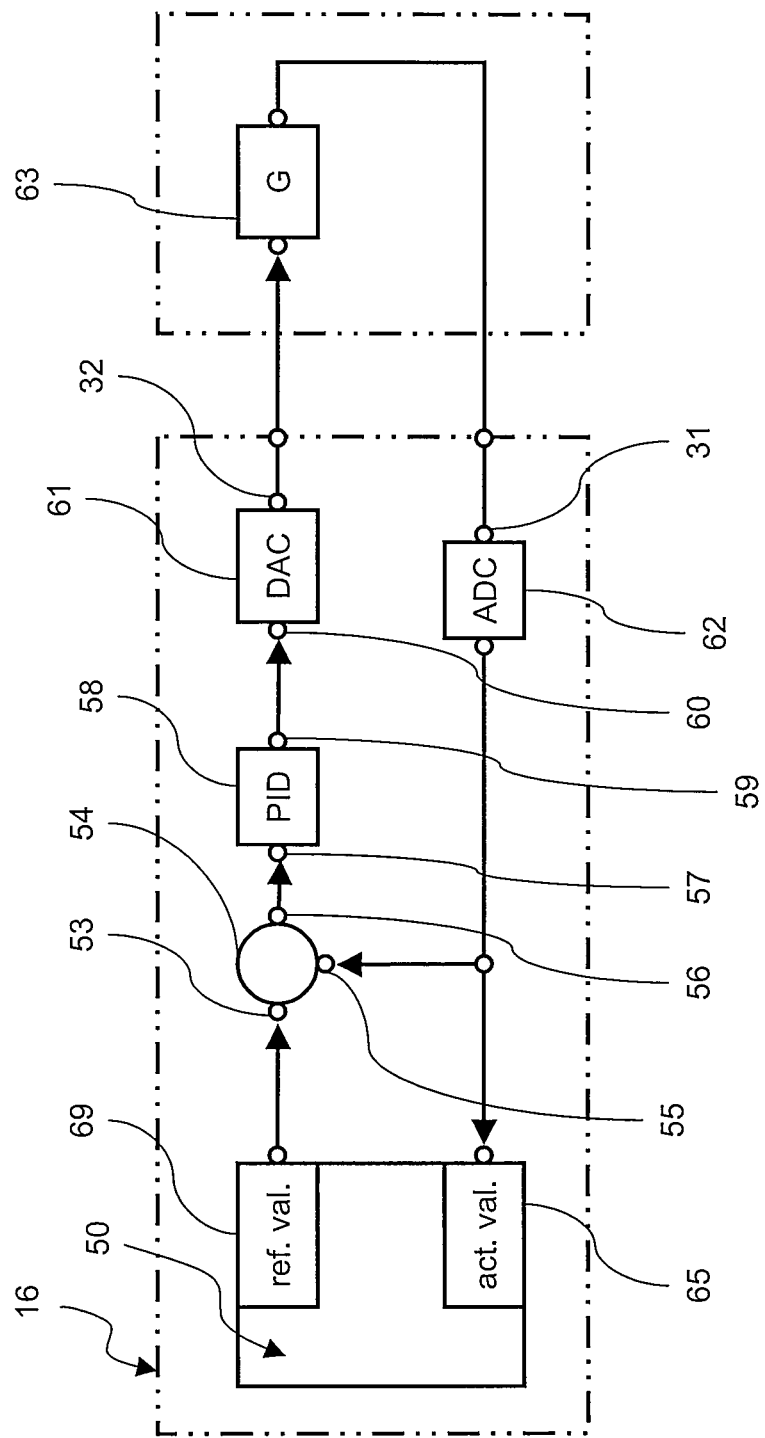
FIG. 3 illustrates a schematic diagram of a controller in a vibration damping unit of the control device.

FIG. 3 shows a controller 16 which comprises a POISON controller 50. The controller 16 is a part of the electronic control device 23.

In the following, the term "reference signal" is also referred to as a reference signal for an actuator or a reference signal for a quantity. Such a quantity is given by, for example, a desired force value, or a desired velocity. Signals will be named after the physical quantity they represent, e.g. as "force reference signal" or "stored force correction signal". Also, depending on the context, the word "cycle" can be used in the term "rotation cycle" where it refers to a repetition of wheel rotation cycles which lead to the periodic disturbances. On the other hand, depending on the context, the word "cycle" can also be used in the term "computational cycle" where it refers to a repetition of computational steps.

The control device 23 further comprises a digital to analog converter (DAC) 61, an analog to digital converter (ADC) 62 and further computation units that are described below. The DAC 61 has several input channels for reading in digitized control signals and also several output channels for sending analog control signals to a controlled system 63. The controlled system 63 comprises the sensors and actuators which are connected to the control device 23 as well as all parts of the steering system that interact mechanically with the sensors and actuators.

In the same way, the ADC 62 has several input channels for reading in analog actual signals from the controlled system 63 and several output channels for output of digitized actual signals. The input channels of the ADC 62 are referred to as input channels of the control device 23 and the output channels of the DAC 61 are referred to as the output channels of the control device 23.

For reasons of simplicity, FIG. 3 shows only the parts of the control device 23 which are relevant to the POISON controller method. The control device 23 may also comprise other control components which are not shown in FIG. 3 to perform further control functions, for example the use of an active front steering (AFS) to integrate the power steering with an electronic stability program (ESP). A coordinating layer of the control device 23, which is also not shown in FIG. 3, controls the operation of the POISON controller 50 with other control components.

An input 65 of the POISON controller 50 is connected to an output channel of the ADC 62. The input channels of the ADC 62 are the inputs of the control device 23. An output 69 of the POISON controller 50 is connected to an input 53 of an adder 54. A second input 55 of the adder 54 is connected to an output channel of the ADC 62. The output channels of a digital analog converter (DAC) 61 are the outputs of the control device 23. The POISON controller 50 further comprises memory sections containing—among others—correction signals and parameter settings for the controlled system 63. The controlled system 63 receives signals from the output terminal 32 of the control device 23. The controlled system 63 sends signals to the input terminal 31 of the control device 23.

An output 56 of the adder 54 is connected to an input 57 of a system controller 58. The system controller 58 is a proportional—integral—derivative (PID) controller. An output 59 of the system controller 58 is connected to an input of a gain factor multiplier 70 which will be shown in FIG. 4. An output of the gain factor multiplier 70 is connected to an input channel of the DAC 61.

Outputs of the control device 23 are connected to inputs of the controlled system 63. Inputs of the control device 23 are connected to outputs of the controlled system 63.

FIG. 3 also illustrates functions of a POISON controller 50 as part of the control device 23 in a control loop. The POISON controller 50 receives a digitized actual value signal from an output channel of the ADC 62. The POISON controller 50 uses the stored correction signal, the reference signal and the digitized actual value signal to compute a new correction signal. The stored correction signal is overwritten with the new correction signal. The POISON controller 50 generates a corrected reference signal from the sum of the new correction signal and the reference signal and sends the corrected reference signal to the output 69 of the POISON controller 50.

The adder 54 receives the corrected reference signal from the POISON controller 50 and also a digitized actual value signal from one of the output channels of the ADC 62. The adder 54 then generates a control error signal by subtracting the digitized actual value signal from the corrected reference signal. The adder 54 sends the error signal to the system controller 58. The system controller 58 uses the control error signal from the adder 54 to compute a controller output signal.

The gain multiplier 70 generates a control signal by multiplying the controller output signal by a velocity dependent gain factor. In contrast to the gain factor for the power assist function which is usually configured to decrease with velocity, the gain factor for the vibration compensation may also increase with velocity to provide a stronger suppression of vibrations at higher speed. The determination of the velocity dependent gain factor uses the actual angle signal from the second output channel of the ADC 62 to find a velocity dependent gain factor in a stored lookup table. The connection from the second output channel to the gain factor multiplier 70 is not shown in FIG. 4 for reasons of clarity.

Next, the gain multiplier 70 sends the control signal to an input channel of the DAC 61. The DAC 61 converts the control signal into an analog control signal and sends the analog control signal to an input of the controlled system 63. The controlled system 63 generates a feedback signal. The controlled system 63 sends the feedback signal back to the input terminal 31 of the ADC 62.

Figure 4:
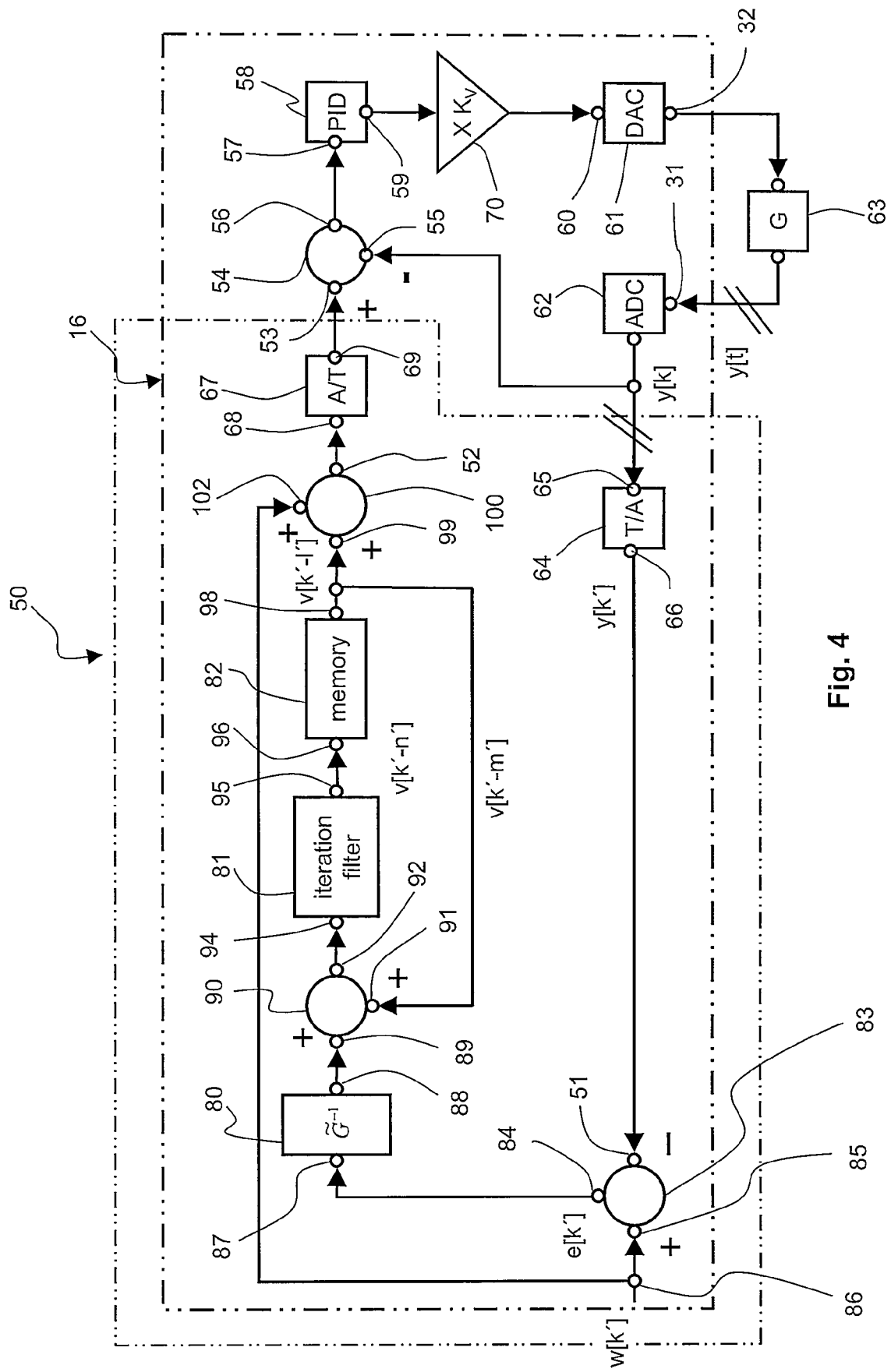
FIG. 4 illustrates a signal flow diagram of the controller of FIG. 3 in further detail.

FIG. 4 shows the components between the input 65 and the output 69 of the POISON controller 50 in further detail. Components of the POISON controller 50 comprise an inverting unit 80, an iteration filter 81 and an iteration memory 82.

Two output channels of the ADC 62 are connected to an input 65 of a time-to-angle transformation unit 64. The two output channels of the ADC provide an actual torque value signal and an actual angle signal of a wheel rotation angle, respectively. In FIG. 4, the two output channels as well as the corresponding input cables to the ADC 62 are symbolized by two slanted lines. An output 66 of the time-to-angle converter is connected to an input 51 of an adder 83. An input 85 of the adder 83 is connected to a reference signal 86. The reference signal 86 is provided by a reference signal generator in the control device 23. A low pass filter in the reference signal generator filters out a low frequency component of the actual torque signal. An upper cutoff frequency of the low pass filter is given by the shortest frequency of a possible driver reaction. The reference signal generator outputs the low frequency component of the actual torque signal as reference signal 86.

An input 87 to an inverting unit 80 is connected to an output 84 of an adder 83. An output 88 of the inverting unit 80 is connected to an input 89 of an adder 90. A second input 91 of the adder 90 is connected to an output 98 of the memory 82. The memory 82 contains a stored correction signal.

An output 92 of the adder 90 is connected to an input 94 of the iteration filter 81. An output 95 of the iteration filter 81 is connected to an input 96 of the memory 82. The output 98 of the memory 82 is connected to a first input 99 of an adder 100. A second input 102 of the adder 100 is connected to the reference signal 86. The output 52 of the adder 100 is connected to an input 68 of an angle-to-time transformation unit 67. An output of the angle-to-time transformation unit is connected to an input 53 of the adder 54 which is also shown in FIG. 3.

In the following, k' refers to a discrete angle index, k refers to a discrete time index and t refers to a continuous time. The symbols w[k'], e[k'], v[k'], y[k'] in FIG. 4 denote digital reference, error, correction and actual value signals. The symbol y[t] denotes an analog actual value signal. Symbols f[k] and f[t] refer to the value of a function at discrete angle k' and continuous time t, respectively. For indices and parameters which refer to the angle domain, primed symbols are used, like for example k', m', P', I', D'. For indices and parameters which refer to the time domain, the respective unprimed symbols are used.

Figure 5:
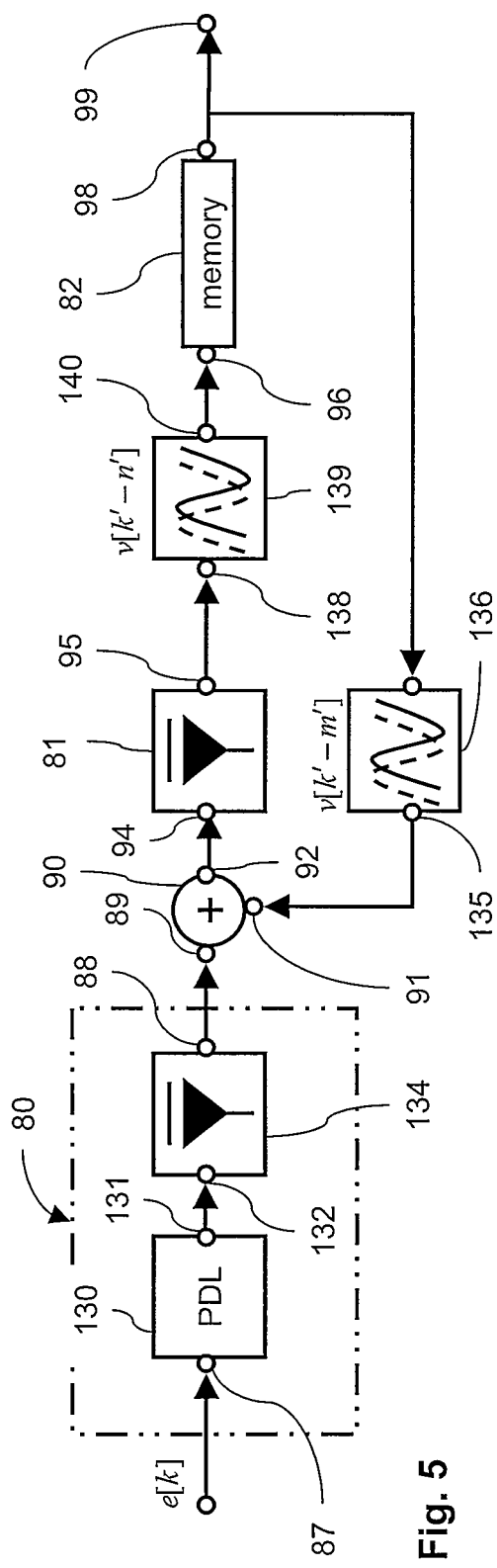
FIG. 5 illustrates in further detail the controller of FIG. 4.
Figure 13:
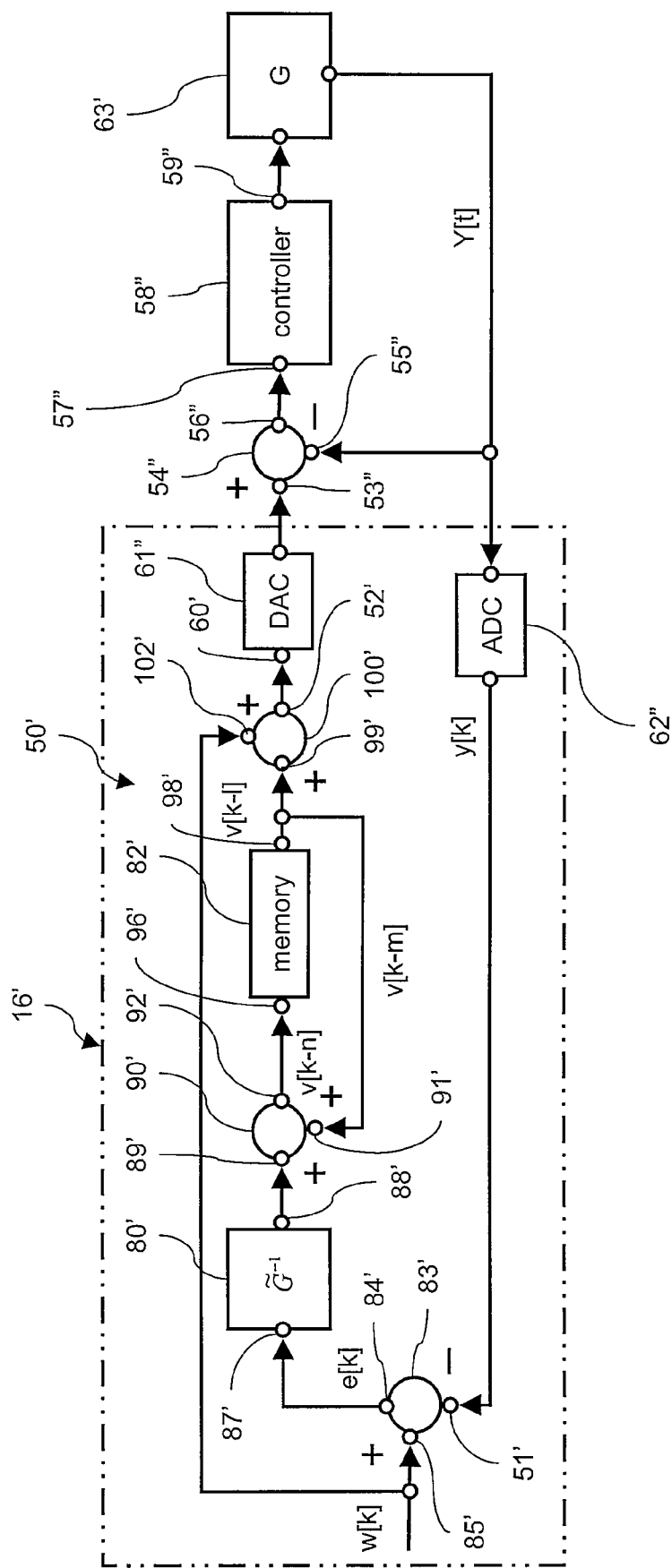
FIG. 13 illustrates a further embodiment of a controller for the power steering system of FIG. 1.
Figure 14:
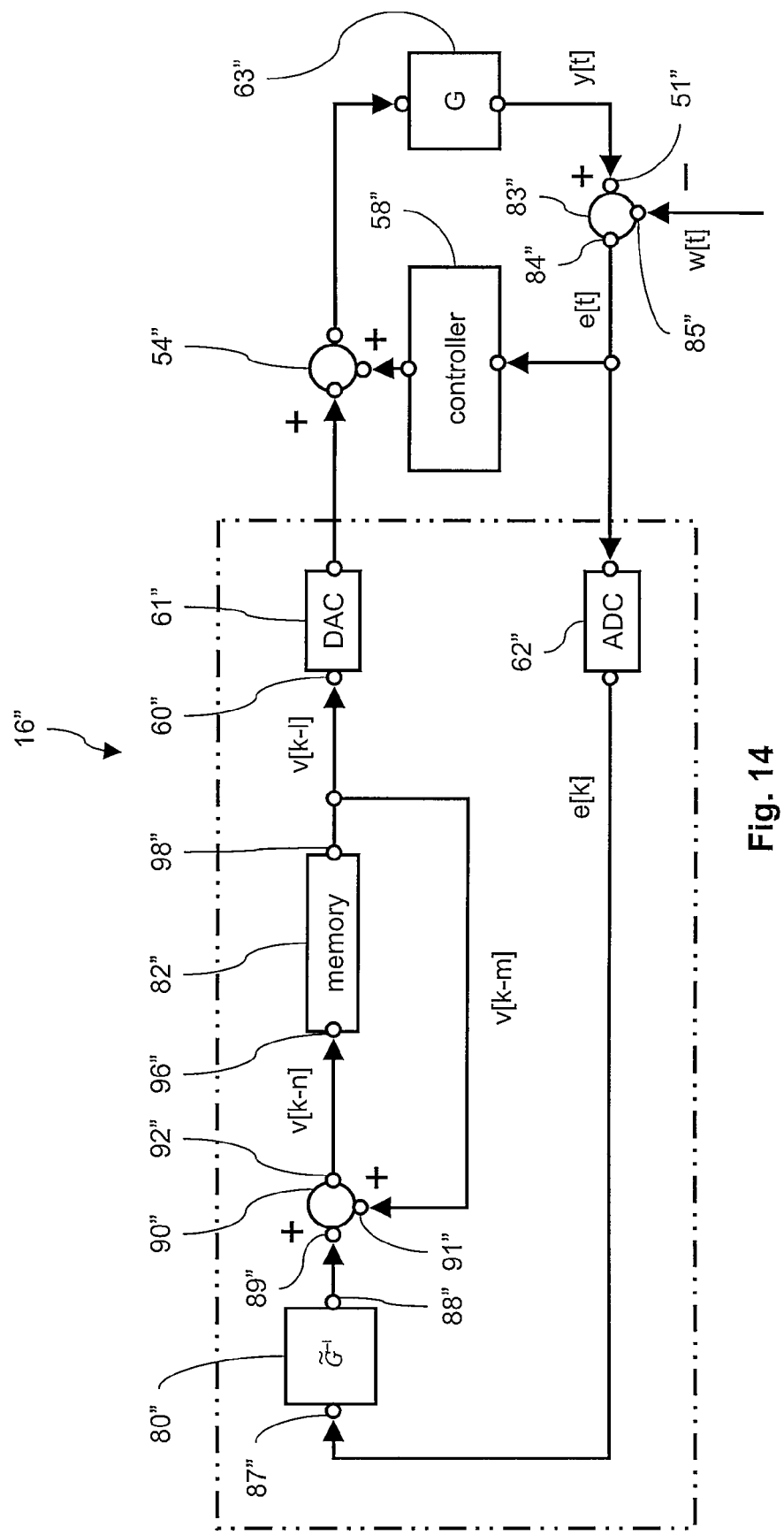
FIG. 14 illustrates a further embodiment of a controller for the power steering system of FIG. 1 in a parallel arrangement.
Figure 15:
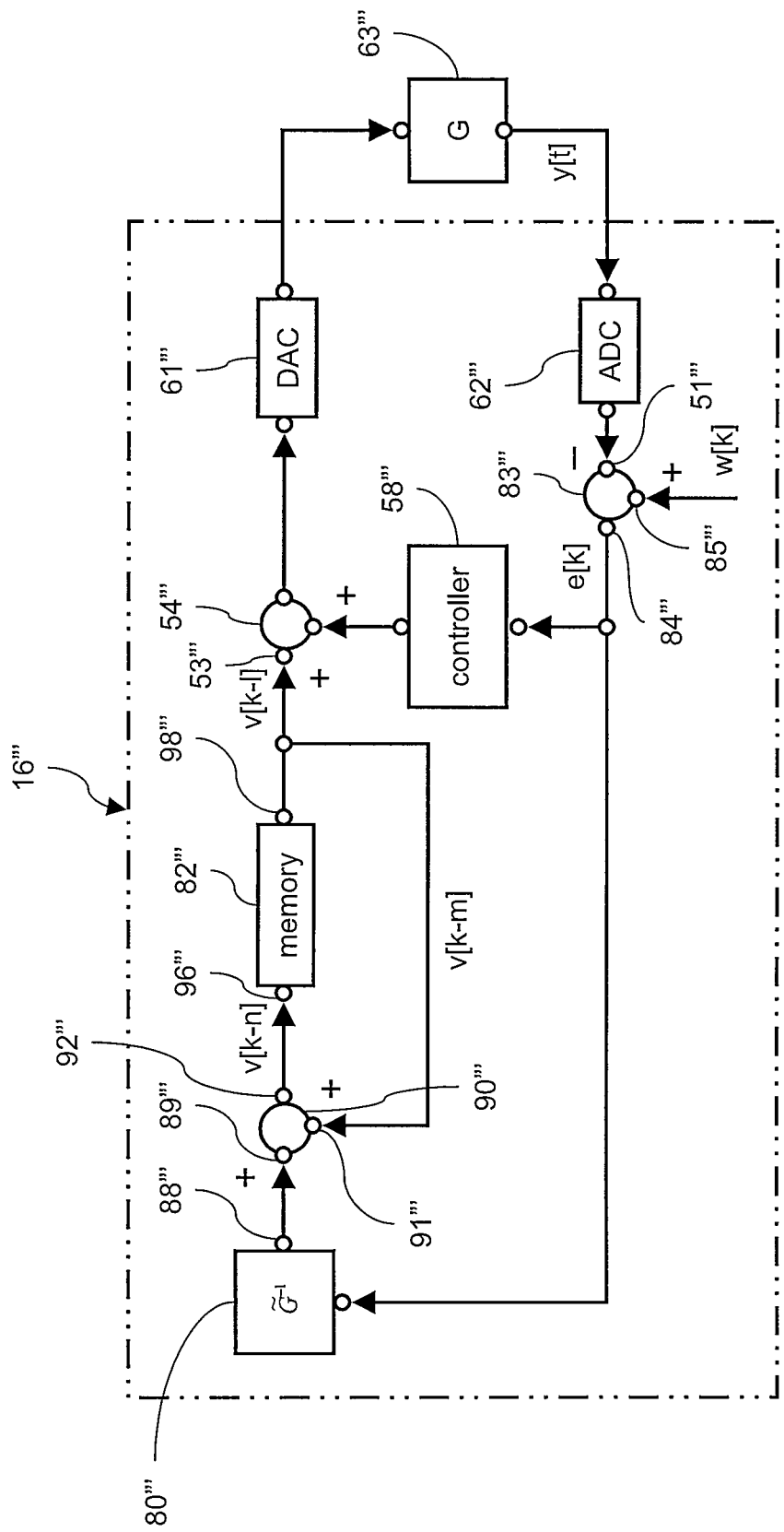
FIG. 15 illustrates a further embodiment of a controller for the power steering system of FIG. 1 in a parallel arrangement.

For reasons of simplicity, time-to-angle transformation units are only shown in FIG. 4 and not in FIGS. 13-15 and primed symbols are only shown in FIGS. 4 and 5. Differences k'-l', k'-m' and k'-n' refer to an angle index within the reference signal "w" or in the cycle of the correction signal v. If a difference results in an angle index before the beginning of a cycle, the length of the cycle in discrete angle units is added to the difference.

POISON controller 50 also comprises a supervision layer which is not shown in FIG. 4. The supervision layer takes into the account the effects of under- and oversampling which may occur due to a sampling with a constant sampling frequency in the time domain.

The effect of under sampling may appear at high wheel rotation speeds. Under sampling in this context means that in a given computational cycle the actual value signal skips indices k' in the angle domain. At a binary level, those indices k' correspond to discrete ADC quantization values. The supervision layer inside the POISON controller 50 makes sure, that no discrete angle index of the signals y[k'], w[k'], e[k'] and v[k'] can be skipped during under sampling. When under sampling, the supervision layer makes the POISON controller 50 perform additional interleaving computational steps for each skipped index k'.

Oversampling, on the other hand, may occur at slow wheel rotation speeds. The above mentioned supervision layer inside the POISON controller 50 also makes sure, that all values inside the POISON controller 50 remain constant as long as the actual value signal of the wheel rotation angle remains at the same discrete value. Regarding over- and under sampling in this way ensures, that every single iteration memory position v[k'] is only updated once per period of the compensating torque pulsation. Other methods to account for the over- and under sampling issues which are known, for example, in the context of order tracking analysis for rotating machinery may also be employed.

During wheel motion, the adder 100 receives an angle-shifted correction signal v[k'-l'] from the iteration memory 82 and a reference signal w[k']. The reference signal w[k'] is generated by the output of a stored reference signal. The adder 100 generates a corrected reference signal by adding the signal v[k'-l'] to the reference signal w[k']. The angle-to-time transformation unit 67 receives the corrected reference signal, converts the corrected reference signal into a time dependent signal and sends the time dependent signal to the output 69 of the POISON controller 50.

During wheel motion, the POISON controller 50 further receives a digitized actual value signal y[k] from one of the output channels of the ADC 62. The time-to-angle transformation unit 64 also receives an actual angle signal of a current wheel rotation angle position from an other output channel of the ADC 62. Next, the time-to-angle transformation unit transforms the time domain signal y[k] into an angle domain signal y[k']. The terms "time domain signal" and "angle domain signal" refer to time dependent and angle dependent signals, respectively. Such signals can be realized, for example, as time-force or angle-force value pairs or by attributing the meaning of time or angle, respectively, to a position in a data stream.

The adder 83 generates an error signal e[k'] by subtracting the transformed actual value signal y[k'] from the reference value signal w[k']. The inverting unit 80 receives the error signal e[k'] and calculates a first output signal. The adder 90 receives the first output signal at the input 89 and a angle shifted correction signal v[k'-m'] from the memory 82 at the input 91 and generates a second output signal by adding the first output signal to the signal v[k'-m']. The adder 90 sends the second output signal to the input 94 to the iteration filter 81. The iteration filter 81 calculates a corrected reference signal v[k']. The signal v[k'] is angle shifted by "-n" index positions and the resulting signal v[k'-n'] is stored in the memory 82.

During a later period of the compensating torque pulsation, the adder 100 uses the stored signal v[k'-r] in memory 82 to calculate a corrected reference value in the way described above.

The angle shift "l" is used to compensate for an angle lag in the response of the controlled system 63, whereas the angle shifts "m" and "n" compensate angle shifts that are introduced by the inverting unit 80 and the iteration filter 81. The inverting unit 80 and the iteration filter 81 use past signal values in their computations. Consequently, the result of the computations corresponds to an earlier angle.

In a further embodiment, which is not shown in FIG. 4, an iteration memory and a buffer memory are provided for storing correction signals. During a computational cycle, the iteration memory is overwritten with the correction signal $v_n$ of the current rotation cycle and the other memory buffer holds the correction signal $v_{n-1}$ of the last rotation cycle. After the iteration memory has been completely updated, the correction signal $v_n$ is copied to the buffer memory and the iteration memory is overwritten again. In the case of an abnormal termination of a computational cycle, the last cycle $v_n$ of the correction signal may be corrupted, whereas the previous cycle $v_{n-1}$ can be recovered. Several options of terminating the operation of the POISON controller are explained with reference to FIG. 11.

FIG. 5 illustrates the inverting unit 80 and the iteration filter 81 in further detail. The inverting unit 80 comprises an inverse system controller 130, which is also referred to as proportional—derivative lag (i.e. PDL or PD lag) controller, and a first moving average filter 134. The PD lag controller 130 is a special case of a PIDL (proportional—integral—derivative-lag) controller. The iteration filter 81 comprises a second moving average filter.

The output 84 of the adder 83 is connected to an input 87 of the PDL controller 130. An output 131 of the PDL controller 130 is connected to an input 132 of the first moving average filter 134. An output 88 of the first moving average filter 134 is connected to a first input 89 of the adder 90. A second input 91 of the adder 90 is connected to an output 135 of a first back-shift element 136, which is in turn connected to the output 98 of the memory 82.

The output 92 of the adder 90 is connected to an input 94 of the second moving average filter 81. An output 95 of the second moving average filter 81 is connected to an input 138 to the second back-shift element 139. An output 140 of the second back-shift element 139 is connected to the input 96 to the memory 82.

FIG. 5 also illustrates the signal processing between the output 84 of the adder 83 and the input 99 of the adder 100 in further detail. The PDL controller 130, which will be explained later, receives the error signal e[k'] from the adder 83 and generates an output signal. The output signal of the PDL controller 130 is made smooth by the moving average filter 134. As mentioned in the description previously, the adder 90 adds the angle shifted correction signal v[k'−m'] from the last cycle to the output signal of the moving average filter 134. The shift by −m' angle steps is symbolized by the angle shift element 136.

The moving average filter 81 receives the output signal of the adder 90 and generates an output signal at the output 95. The output signal of the moving average filter 81 is shifted by −n' angle steps. This is symbolized by the angle shift element 139. The output signal of the angle shift element 139 is the correction signal which will be used in the next operation in a subsequent period. As mentioned earlier, the memory 82 stores the correction signal v[k'−n'].

Figure 6:
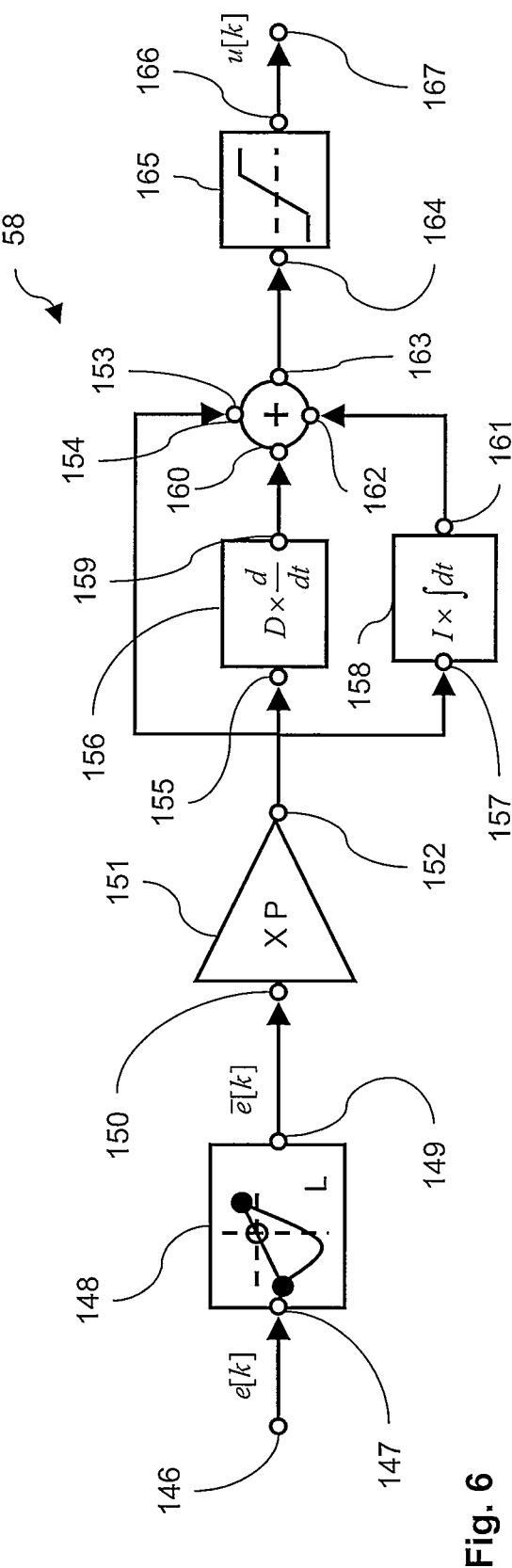
FIG. 6 illustrates a PID lag controller in the controller of FIG. 4.

FIG. 6 illustrates the composition of a proportional-integral-derivative lag (PIDL) controller which is used in the control device 23. The system controller 58 and a second system controller 194 shown in FIG. 3 and FIG. 8, respectively, are configured as PIDL controllers. In the following, both expressions, PID and PIDL controller are used for the controllers 58 and 194. A PID lag controller without an integrator component will be referred to as a PDL controller. The inverse system controller 130 of the inverting unit 80 of FIG. 5 is configured as a PDL controller.

An input 146 to the PID lag controller is connected to an input 147 of a lag element 148. An output 149 of the lag element 148 is connected to an input 150 of a multiplier 151. The output 152 of the multiplier 151 is connected to a first input 153 of an adder 154, to an input 155 of a differentiator 156 and to an input 157 of an integrator 158. An output 159 of the differentiator 156 is connected to a second input 160 of the adder 154. An output 161 of the integrator 158 is connected to a third input 162 of the adder 154. An output 163 of the adder 154 is connected to an input 164 of an output limiter 165. An output 166 of the output limiter 165 is connected to an output 167 of the PIDL controller.

A lag element 148 receives an error signal e[k] via the input 147. The lag element 148 generates an averaged error signal ē[k] by computing a weighted sum from a current value e[k] and a previous value e[k−1] of the error signal e[k]. A weight factor L of the lag element 148 allows adjustment of the weighted sum.

The multiplier 151 receives the output signal ē[k] of the lag element 148 at the input 150 and multiplies the signal ē[k] by a factor P. The differentiator 156 receives the output signal of the multiplier 151, computes a time derivative of the signal ē[k] by a backward differentiation formula and multiplies the result by a parameter D. The integrator 158 receives the output signal of the multiplier 151, computes the integral over past values of its input signal by a numerical integration formula and multiplies the result by a factor I.

The adder 154 generates an output signal at its output 163 by summing up the output signal of the multiplier 151, the output signal of the differentiator 156 and the output signal of the integrator 158. The output limiter 165 receives the output signal of the adder 154 at the input 164. The output limiter 165 limits the output signal of the adder 154 by an upper limit and a lower limit and further sends the resulting signal u[k] to the output 167 of the PIDL controller. The output limiter 165 of the PIDL controller prevents numerical instability by integral windup.

The parameters P, D and I allow the adjustment of the relative contributions of the three input signals from the inputs 153, 160, 162 of the adder 154.

The PIDL controller which is shown in FIG. 6 works in the time domain. Without loss of generality, the time-based operations integration and differentiation can be directly transformed into angle-based operations when working in the angle domain. Especially the inverting unit 80 of the POISON controller 50 may be implemented in the angle domain. This also may require transformed parameters I', D' and L' and possibly a transformation of the integration range.

Figure 7:
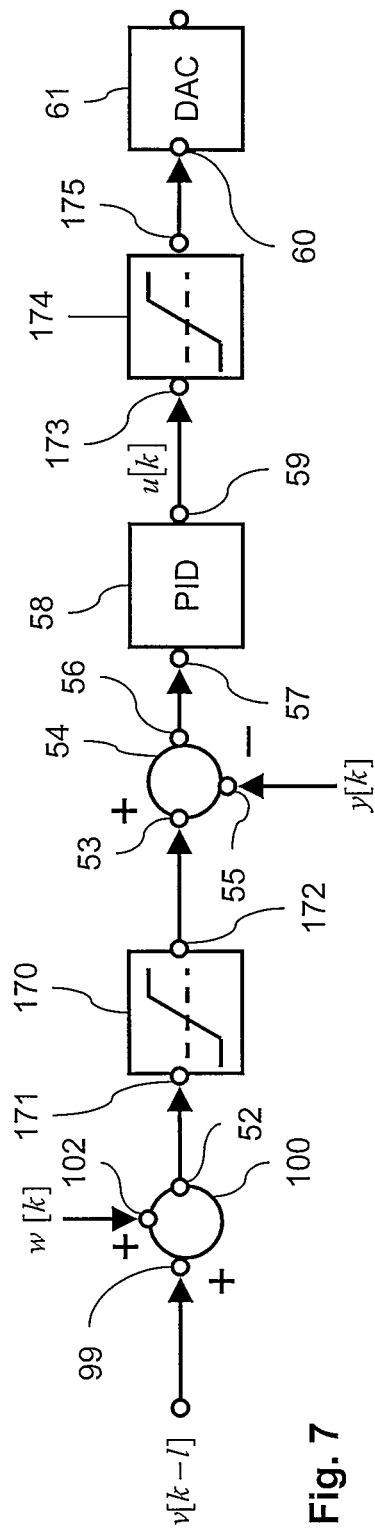
FIG. 7 illustrates a PID controller in the controller of FIG. 4.

FIG. 7 illustrates the signal processing units between the adder 100 and the DAC 61 of the POISON controller 50 in further detail. In addition to the signal processing units of FIG. 4, FIG. 7 shows two output limiters 170, 174 which are not shown in FIG. 4. The output 52 of the adder 100 of FIG. 4 is connected to an input 171 of the first output limiter 170. The output 172 of the first output limiter 170 is connected to the input 53 of the adder 54. The output 59 of the system controller 58 is connected to an input 173 of the second output limiter 174. An output 175 of the second output limiter 174 is connected to an input channel of the DAC 61.

FIG. 7 also illustrates how a stored correction signal is used for generating a control signal for the controlled system 63.

The adder 100 receives an angle correction signal v[k'−l'] from the output 98 of the memory 82 of FIG. 4 at its first input 99. The adder 100 receives a reference signal w[k'] at its second input 102 and generates a corrected reference signal at the output 52 by summing up the correction signal v[k'−l'] and the reference signal w[k']. The output limiter 170 limits the corrected reference signal by a lower limit and an upper limit and sends the output to the input 53 of the adder 54. The adder 54 receives an actual value signal y[k] at the input, sums up the input signals and sends the resulting signal to the system controller 58.

The system controller 58 computes a control signal and sends the result to the input 173 of the output limiter 174. The output limiter 174 limits the output signal of the system controller 58 to a predefined voltage range and sends the resulting signal to the input to the DAC 61. The DAC 61 converts the output signal of the output limiter 174 into an analog control signal and sends the converted analog control signal to the controlled system 63.

Figure 8:
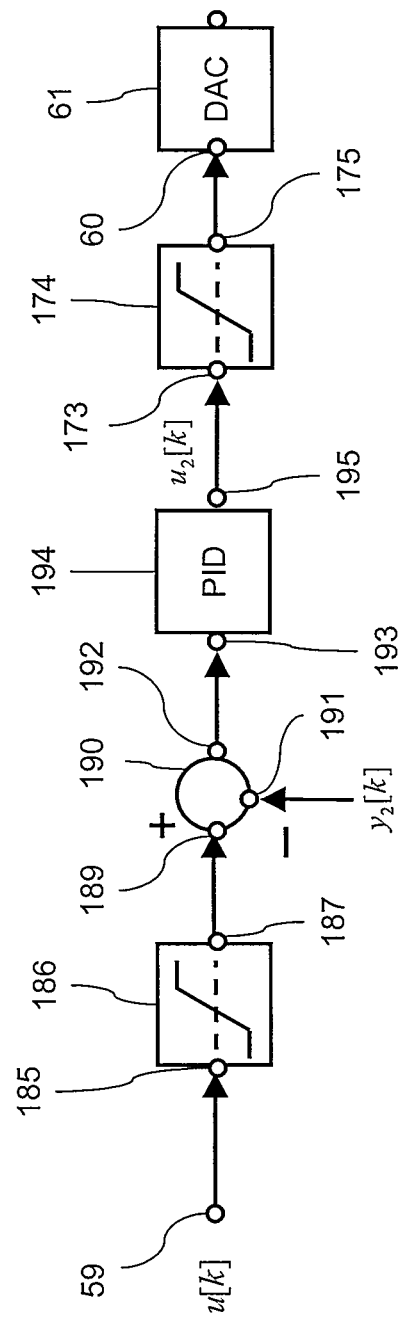
FIG. 8 illustrates the usage of a second PID controller as a correction in the controller of FIG. 7.

In FIG. 8, the output 59 of the system controller 58 is connected to an input 185 of an output limiter 186. An output 187 of the output limiter 186 is connected to an input 189 of an adder 190. A second input 191 of the adder 190 is connected to an actual value signal of the steering angle, which is derived from the output signal of the angle sensor 24. An output 192 of the adder 190 is connected to an input 193 to a second system controller 194. An output 195 of the second system controller 194 is connected to an input 173 of the output limiter 174.

FIG. 8 shows the use of additional components between the output 59 of the system controller 58 of FIG. 7 and the input 173 to the output limiter 174 of FIG. 7. This provides a further correction to the output result of the system controller 58 of FIG. 7. The further correction uses an actual angle signal y_2[k'] of a steering angle. The actual angle signal is derived from the output signal of the angle sensor 24. The further correction of FIG. 8 is referred to as "cascaded control".

The cascaded control has the advantage of being more robust against nonlinearities but the response of the controller may get less dynamic and a more complex error recognition and handling may be necessary to account for a failure of an additional angle sensor. Therefore, the cascaded control is considered as an optional variant here.

In FIG. 8, the system controller 58 of FIG. 7 is used as an outer system controller 58 which controls a second system controller 194 that is also addressed as PIDL controller 194. The PIDL controller 58 of FIG. 7 will generally use different parameter values P, I, D, L when the additional angular correction of FIG. 8 is applied.

The output limiter 186 receives the output signal of the system controller 58 and limits the output signal of the system controller 58 to be within a lower limit and an upper limit. The output limiter 186 further sends the result to the input 189 of the adder 190. The adder 190 receives an actual value signal for the turning angle of the steering shaft at the second input 191, generates an output signal by summing up the input signals and sends the output signal to the input 193 of the second system controller 194. The second system controller 194 computes a control signal and sends the control signal to the input of the output limiter 174 of FIG. 7.

Figure 9:
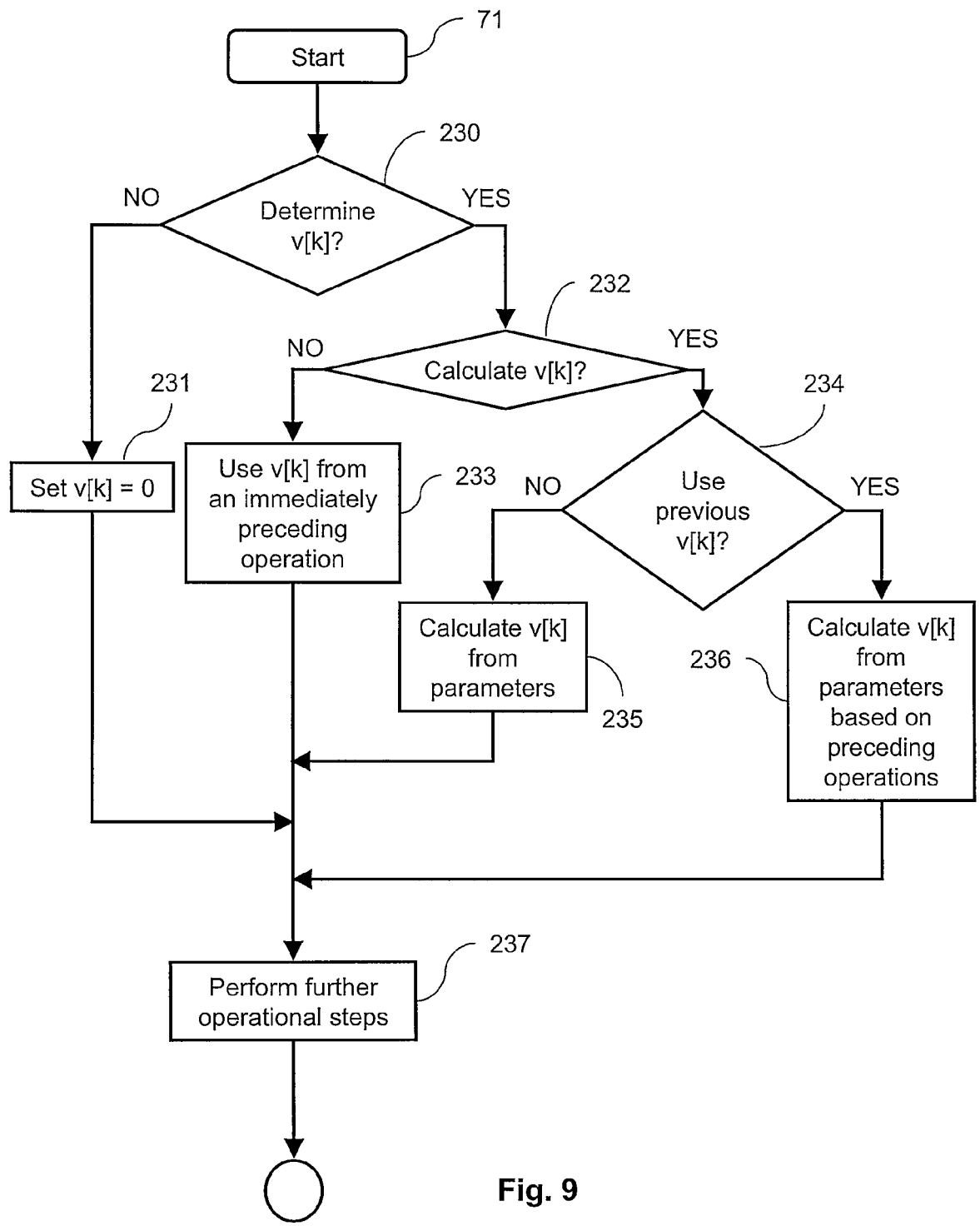
FIG. 9 illustrates the determination of initial values for a stored correction signal in the controller of FIG. 4.

FIG. 9 shows a flow diagram which illustrates determination of an initial correction signal v[k] of an operation of the steering system 1.

After the start 71 of the operation, in a first decision step 230, a decision is taken, if the initial correction signal v[k] will be determined from prior data. If this is not the case, in step 231, the initial correction signal v[k] is set to zero. In a second decision step 232, a decision is taken, if the stored correction signal v[k] will be computed. If this is not the case, in a step 233 the stored correction signal of an immediately preceding operation is initialized with a correction signal from a subsequent operation. If several correction signals from previous operations are available, the POISON controller 50 may use a correction signal from a previous operation with the best matching parameters.

If in the step 232 a decision has been taken to compute an initial correction signal, a third decision step 234 decides, if information from previous operations will be used. If this is not the case, in a step 235 an initial correction signal is computed which is based on parameters of the POISON controller 50. Otherwise, in a step 236, the POISON controller 50 computes an initial correction signal, which is based on the controller parameters and on stored correction signals of previous operations. A step 237 symbolizes further steps that are useful for operating the steering system 1.

Figure 10:
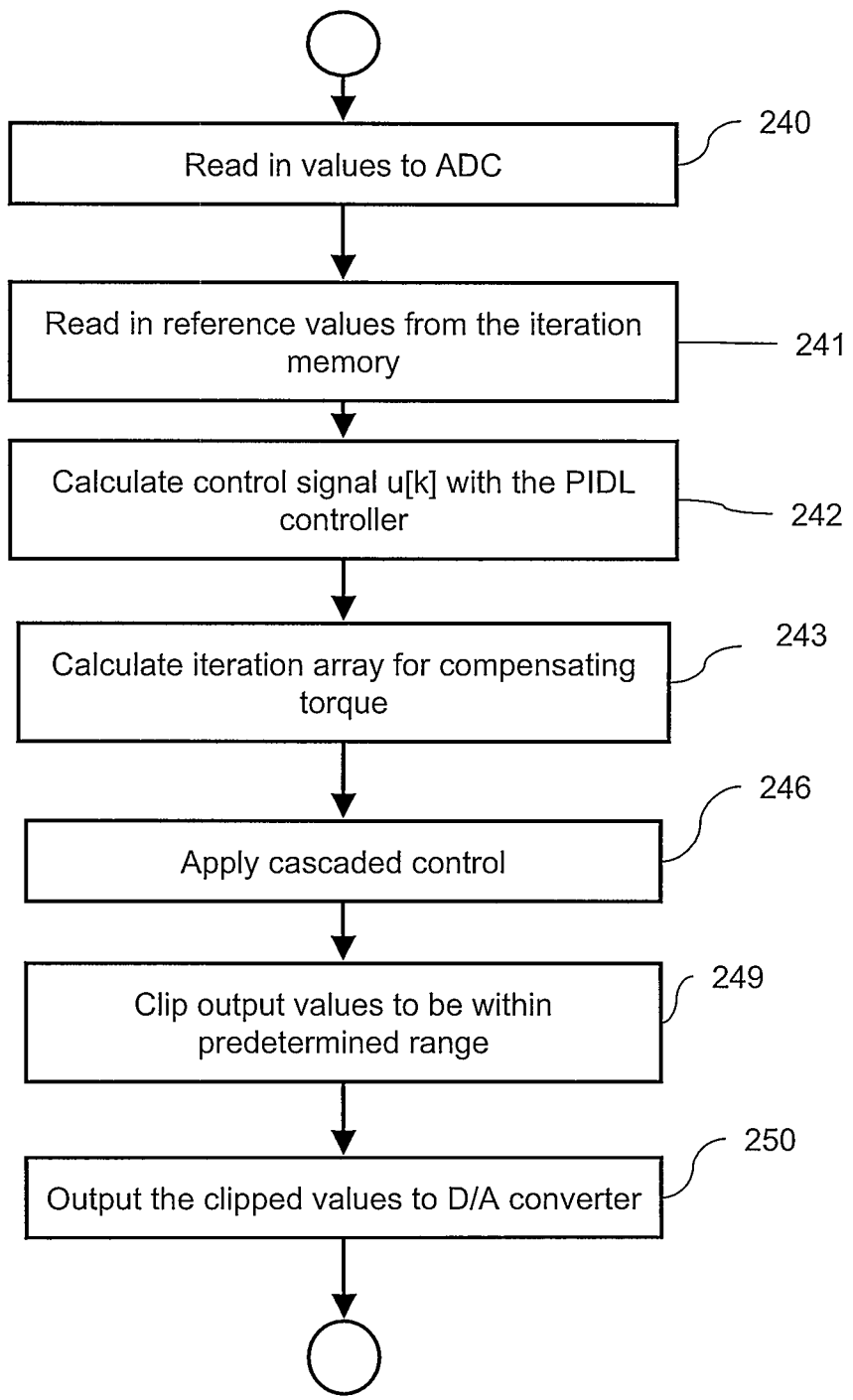
FIG. 10 illustrates the computation of force control signals for the controlled systems of FIG. 1.

FIG. 10 shows the steps that are performed by the control device 23 during a computational cycle in further detail.

In a first step 240, the control device 23 reads in the actual values for the controlled system 63 to the input channels of the ADC 62. In a next step 241, the control device 23 reads in the reference value for the controlled system 63. In a computation step 242, the control device 23 calculates a control signal u[k] for the electric motor 20 according to the description of FIG. 6. In a next step 243, the POISON controller 50 calculates a new correction signal v[k'], according to the description of FIG. 5. In a next step 246, the control device 23 applies a further correction to the control signal u[k], which is explained in conjunction with FIG. 8. In a step 249, the output of the control device 23 is clipped to be within a predefined voltage range. In step 250, the control values for the electric motor 20 are sent to the respective input channels of the DAC 61.

Figure 11:
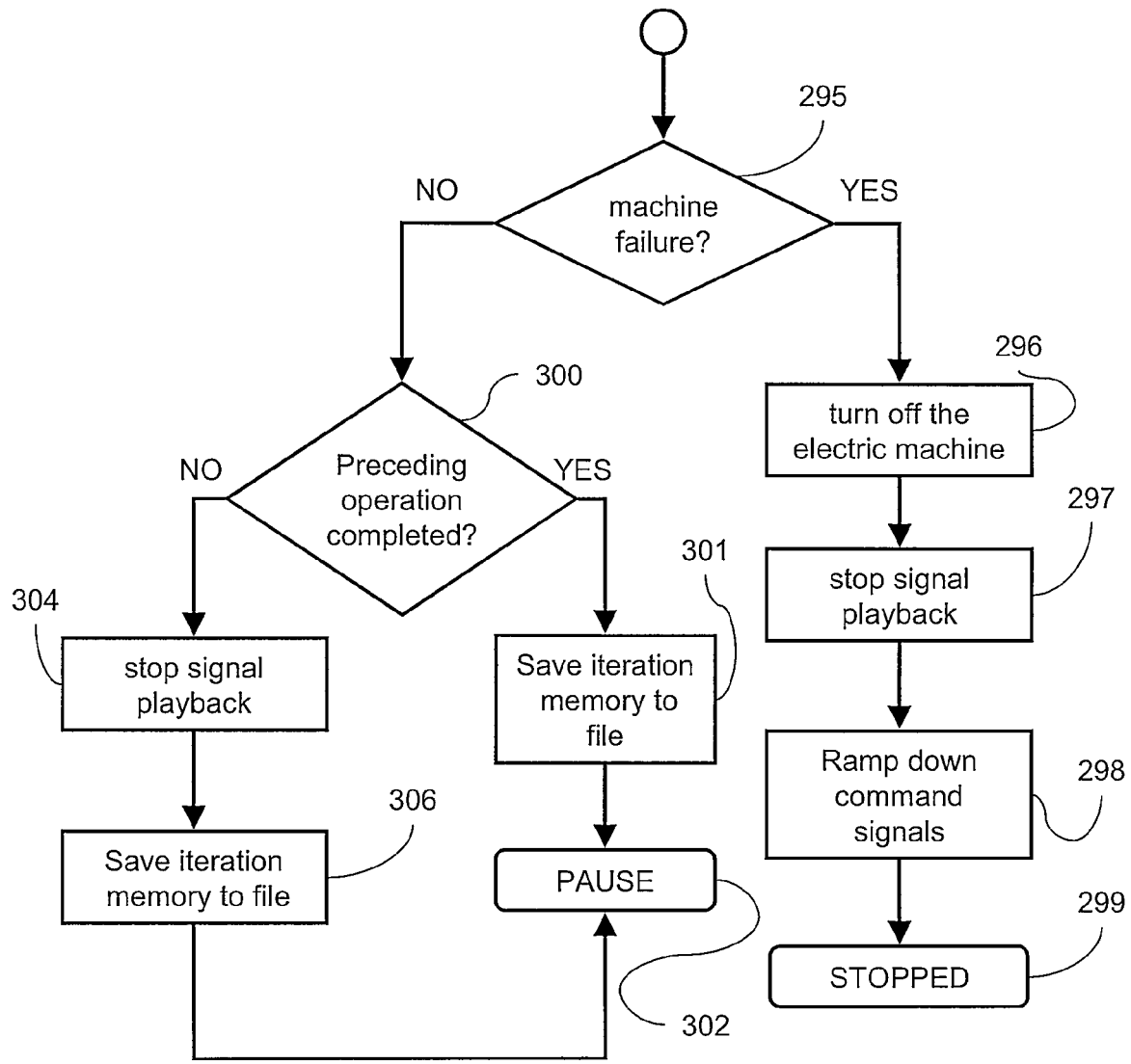
FIG. 11 illustrates a flow diagram for handling an error condition.

FIG. 11 shows a flow diagram of different termination options for terminating an operation of the power steering system. In a decision step 295, a decision is taken if an error condition is present. For example, this error condition is due to a hardware detected limit fault. Alternatively, a programmable logic controller (PLC) detects the error condition. If a machine failure is detected, in a step 296, a status information is sent to the control device 23. In case of a severe failure, the control device 23 turns off the power supply and power output of the electric motor 20 and decouples the pinion 15 from the steering shaft 3. The decoupling of the pinion 15 provides a manual operation mode to the steering system. In a next step 297, the signal playback of the command signals to the controlled system 63 stops. Then, in a step 298 the command signals are ramped down to predefined values, and the steering system 1 changes to a stopped state 299.

If no error condition is present, in a decision step 300, a decision is taken if a full period of a compensating vibration has been completed. If the preceding operation has been completed successfully, in a step 301 the stored correction signal is saved to a file.

If, in step 300, it is detected that a full period of the preceding compensating vibration has not been completed, the signal playback is stopped in a step 304. In a next step 306, the stored correction signal is written to a file stored in the iteration memory 82. In a step 302, the steering system 1 changes to a pause state. The saved file in the iteration memory 82 can be used as an initial correction signal in subsequent operation based on either the immediately preceding operation or multiple preceding operations, as in steps 233, 236 of FIG. 9, respectively.

In the pause state 302, the steering system 1 remains ready for next operation, whereas in the stopped state 299 the power assistance is disabled and a warning sign informs the driver that the power steering system must be repaired.

The moving average filters 81, 134 represent a special type of a finite impulse response (FIR) low pass filter. The bandwidths of the moving average filters 81, 134 are adjustable parameters of the POISON controller 50.

The application provides a control device 23 for controlling cyclic and repeated disturbances in a steering system. Therefore, within the scope of the present application, the control device 23 and all parts which interact with the control device 23 to perform the controlling function are also referred to as "steering control system".

In the control device 23 a POISON controller 50 is provided to reduce torque pulsations by continuous iterative learning of a pattern of a corrective torque signal. The cycle or phase of the control signals of the POISON controller 50 are obtained by a sensor or multiple sensors. The correction signal for compensating wheel vibrations is a function of the sensor data. The POISON controller uses the fact that the vibration pattern of the wheel is, at least partially, a periodic function of the wheel rotation angle.

The application provides a method for complying with nonlinear distortions of a controlled system by developing a compensating signal within a few cycles of a periodic disturbance. As the POISON controller 50 is always online during the operation of the steering system, convergence is fast and adaptation to changed system conditions takes place from one cycle to the next. Due to the iterative improvement of the stored correction signal, an opposite torque pulsation develops automatically which has the same frequency and an appropriate phase shift, compared to the vibration of the wheel.

The POISON controller 50 works online. Therefore, it is able to readjust itself constantly. The control device 23 with the POISON controller 50 according to the present application can adapt to changes of the controlled system which are slow compared to one disturbance cycle. Therefore, the improved control device 23 is able to compensate for a tear and wear of wheels and of the mechanical parts of the steering system.

As the POISON controller 50 adjusts itself from cycle to cycle, there is no need for an iterative adjustment before the start of an operation. There are only a few parameters that users need to adjust in advance. Therefore, system identification is not required. However, the system identification or iterations to initially adjust the POISON controller 50 may be performed in advance, if desired.

Moreover, the signal processing algorithm of the POISON controller 50 can be implemented by using only computations in the angle domain, thereby avoiding the overhead for additional transformations to the frequency domain and vice versa.

Furthermore, the POISON controller 50 acts as a feed forward controller during a cycle of a periodic input signal and is able to take corrective action before a control deviation occurs. This ability is due to the use of a stored correction signal from a previous cycle of a periodic input signal.

Moreover, the computation in the POISON controller 50 uses computationally efficient building blocks. This leads to a fast algorithm allowing for execution on a real time processing unit at high time resolution.

The control device 23 according to the application only needs a simple model of the controlled system 63 whose parameters remain fixed during the operation. The parameters may also be allowed to vary with angle. The application avoids the difficulties of matching the parameters of an adaptive controller with a large number of degrees of freedom. These adaptive controllers cannot be applied easily.

A controller according to the application requires no detailed knowledge of the controlled system 63 for adjusting the parameters of the controller, as it would be the case with adaptive controllers. Once the parameters of the inverse system model have been determined, the control device 23 will adjust itself during the operations. These filters, which are provided in an embodiment of the application, can easily be adapted with basic control theory knowledge for providing a convergent control strategy. Simple online tests can help to improve the function of these filters.

In the embodiment of FIG. 4, which uses a serial arrangement, the POISON controller 50 can be easily integrated into an existing control loop of a steering system, simply by using the output signal of the POISON controller 50 as input signal to an existing system controller. The serial arrangement of FIG. 4 has an additional advantage compared to a parallel arrangement of a learning controller as shown later in that it prevents the emergence of an undesired contribution in the iteration memory which counteracts the integration component of a PID system controller.

Correction signals of the POISON controller 50 are continuously checked so that changes in the vibration behavior of the steering system 1 are detected. In case of imminent failure, which can be represented by exceptional amplitude of torque compensation, warning messages can be sent to the driver at an early stage. This enables the driver to send the automobile to a repair shop before the automobile breakdown.

The POISON controller 50 enables the steering system to compensate torque pulsation to achieve a desired torque output. This enables a worn steering system 1 to perform nearly as good as a newly manufactured steering system 1.

The disturbance control with the POISON controller has the further advantage to make much higher assistance torques possible without causing uncomfortable vibrations on the driver side.

In fact, regular maintenance can be reduced because the driver only needs to send the steering system for repair when control device 23 informs the driver that compensating torque of the electric motor 20 has exceeded predetermined limits, which signifies a failure in the steering system 1. Therefore, the driver can avoid or at least reduce routine, standard and costly maintenance by just following warning signals generated by the control device 23 for repair.

The POISON controller 50 according to the application comprises a first learning controller input for receiving an actual value signal. In the embodiment of FIG. 4, the first input of the learning controller corresponds to the input 51 of the adder 83. The actual value signal is derived from a controlled system, e.g. generated by a sensor of a controlled system 63. The POISON controller 50 also comprises a POISON controller output. In the embodiment of FIG. 4, the output of the POISON controller 50 corresponds to the output 69 of the angle-to-time transformation unit 67.

The controlled system 63 further comprises an actuator, for example the electric motor 20, for applying a control signal and also all parts, which interact with the sensor 29 and with the actuator. The actuator may also be referred to as "force actuator".

The output signal of the POISON controller 50 is used as an input signal for a control unit. In the embodiment of FIG. 4, the control unit corresponds to the adder 54 and the controller 58. The control unit derives a second input signal from the actual value signal of the controlled system 63. In the embodiment of FIG. 4, the control unit reads in the second input signal from the input 55 of the adder 54.

An inverse system unit in the learning controller uses the deviation between the actual value signal and the reference signal to derive a first correction signal. In the embodiment of FIG. 5, the inverse system unit corresponds to the adder 83 and the inverting unit 80. The first correction signal corresponds to the output signal of the inverting unit 80.

A filtering unit uses a previously stored signal from an iteration memory and the first correction signal for deriving a filtered correction signal. In the embodiment of FIG. 4, the filtering unit corresponds to the adder 90 and the iteration filter 81. The filtered correction signal is then stored in the iteration memory 82 for use in one of the subsequent cycles of a torque oscillation.

The POISON controller 50 further comprises a correction signal unit for deriving a correction output signal from the stored correction signal and from the reference signal. In the embodiment of FIG. 4, this correction signal unit corresponds to the adder 100. The correction output signal is the output signal of the POISON controller 50. It corresponds to the corrected reference signal at the output 52 of the adder 100 in the embodiment of FIG. 4. The deriving of the correction output signal can be done with analog means or with digital means. The expressions "computing" and "deriving" are not restricted to the calculation with a digital computer but they are also applicable to generation of the correction signal with an analog circuit. Both options can be combined to use analog/digital means for computing the output correction signal.

A controller according to the application comprises one or more features of the aforementioned POISON controller 50 and of the aforementioned control device 23. This is best seen in FIG. 3, which shows an embodiment of a controller 16 that comprises a POISON controller 50. The controller derives an input signal from the actual value signal of the controlled system. The output signal of the controller is derived from the output signal of the control unit in the control device 23.

In a broader sense, a control device according to the application can itself be made up of several control devices, each one performing a dedicated task. For example, in a vehicle with multiple steerable wheel pairs, separate control devices can be provided for computing a control signal for each of the power steering assemblies.

The POISON controller 50 is a learning controller, which may be designed in various ways. The arrangement of the POISON controller 50 according to FIG. 4 in which the system controller 58 derives its input from the output of the POISON controller 50 is called a serial arrangement. In the serial arrangement, the correction output signal of the POISON controller 50 is also referred to as first reference signal and the aforementioned reference signal is also referred to as second reference signal.

The embodiments may be carried out with other means which are adapted to the needs of the person skilled in the art. For example, the worm of the electric motor may also be connected to the steering rack 6. The steering arrangement may also be realized without a means to decouple the steering shaft from the electric motor. In place of an electromechanical power steering, a hydraulic power steering with hydraulic actuators may be used.

A controller according to the invention may also be used in a steer by wire system. In the case of a steer by wire system, it is not necessary to use a low pass filter for a determination of the torque reference signal, although a high pass filter may be used to separate the disturbances. Instead, the driver's input torque is already known, because it is equal to the difference of the applied torque at the steering wheel to the electrically transmitted torque feedback. As a steer by wire system has no steering column, the disturbance signal cannot be deduced from a high frequency component of a torque signal.

Therefore, in this case it is beneficial to use the output signal of the acceleration sensor 27 as an actual force signal at the input 31 of the ADC 62 instead. If a high pass filter is used to separate the disturbances, the reference signal for the POISON controller 50 may be set to 0 to suppress accelerations in the high frequency range.

During steering, a driver's intention is to turn the steering wheel. Therefore the desired value that the driver has in mind is a steering angle. To reach the desired angle, the driver applies a torque on the steering wheel which then becomes a steering torque. In the driver's mind, the steering torque is often a secondary quantity. A possible strategy to take this into account in an ESP is to ensure that the driver never feels a steering torque above a certain predefined value, e.g., 5 Nm. According to this strategy, the electric power steering generates a desired torque which is proportional or otherwise related to the applied torque of the driver for a torque below 5 Nm. Above 5 Nm, the desired torque is set to +5 Nm or −5 Nm for steering to the left or steering to the right, respectively.

Instead of an angle sensor, a motion sensor or any other sensor from which a rotational angle can be derived may be used. In the context of the application this is also referred to as "position sensor". The torque sensor 19 at the torsion bar may be realized in various ways. For example, it may be realized as a potentiometer slider which is used to determine the torsion angle. It may also be realized as a magneto restrictive sensor. As the magnetostrictive sensor is capable of measuring the torque directly, no torsion bar and no separation of the steering shaft in an upper and a lower part is required in this case. The torsion of the torsion bar may also be determined by measuring a frequency response of the torsion bar.

If more than one POISON controller is employed, the calculations for each of the POISON controllers may be carried out in parallel. For parallel computation, a scheduler of the control device 23 of FIG. 1 attributes time slices to each parallel process. If the control device 23 has several processors, the time slices may be attributed to different processors. A global memory section is used for the exchange of data between the control loops.

The POISON controller 50 may also comprise an adaptive procedure which readjusts the parameters during the operation of the steering system 1. Alternatively, the control device 23 may further comprise an adaptive controller.

Many known controllers work in the time domain because the response of the controlled system depends on time. In a rotating system, there are perturbations which are periodic with respect to the rotation time. Therefore it is advantageous to design a controller that operates in the angle domain. Consequently, in the aforementioned embodiments, the sampling index k' corresponds to an angle variable.

However, the response of the controlled system not only depends on the angle but also directly on time. As a consequence, the optimal control parameters depend on the rotation velocity. Such a dependence exists already in the time domain, as the system response in the time domain will also change with respect to rotation velocity. A learning controller according to the application can—at least partially—compensate for a changing system response by its learning feature. The convergence of the learning process may be slower if the control parameters are not chosen in an optimal way. Even so, the simplest approach to leave the control parameters constant will be sufficient in many cases.

A simple approach to compensate for the introduced dependence on a rotation velocity $\omega$ consist in multiplying the control parameters by factors proportional to $\omega$ or $1/\Omega$. If the rotation is fast enough, the rotation velocity is essentially constant within one rotation period and can therefore be replaced by a mean value. Instead of transforming the control parameters it is equally possible to transform the angle index k' into the time domain by dividing the angle index k' by $\omega$ before carrying out the calculations. According to this approach, the control parameters are transformed with respect to the rotation velocity $\omega$ as explained hereafter.

In the following, $T_0$ is the sampling time which is equal to the computational time period of the control device 23 ($T_0=1/$f_CONTROLLER SAMPLING_FREQUENCY), T is the time period of one wheel rotation (T=$2\pi/\omega$), S is the wheel angle sensor resolution per wheel rotation period (i.e., the amount of angle sensor digits per wheel revolution). P, I, D, L, k, l, m, n, the filter width FW_IT of the iteration filter 81 and the filter width FW_MA of the moving average filter 134 are parameters of a time domain POISON controller. To do the transformation of those parameters, we assume almost steady state conditions, i.e., a wheel rotation speed which remains almost constant from one rotation to the other.

In every computational cycle, all actual value signals are measured. Furthermore, in every computational controller cycle, the actual wheel rotation time period is measured or estimated. This allows to transform all time domain controller parameters into their angle domain equivalents:

P'=P as the P-gain is a dimensionless constant
I'=I*T/S as I is a reciprocal time
D'=D*S/T as D is the differentiation time
L'=L*S/T as L is the lag time
k'=round(k*$T_0$*S/T) time index becomes angle index
l'=round(l*$T_0$*S/T) time shift becomes angle shift
m'=round(m*$T_0$*S/T) time shift becomes angle shift
n'=round(n*$T_0$*S/T) time shift becomes angle shift FW_IT'=round(FW_IT*$T_0$*S/T)
FW_MA'=round(FW_MA*$T_0$*S/T)
wherein "*" denotes multiplication, "/" denotes division, "'" denotes a parameter in the angle domain and "round" denotes a rounding operation.

The abovementioned transformations with respect to the rotation velocity ω can be combined with an adaptive adjustment of the control parameters according to a system model. The system model may also depend on system parameters other than the rotation velocity ω, such as parameters which depend on the load on the steering system, for example.

When the iteration array contains angle dependent values v[k'] there is also a angle-to-time transformation required to determine the discrete time index k of the correction signal u[k] at the input of the DAC converter 61.

With respect to the location of the transformation unit there are further alternatives. For example, the time-to-angle transformation and the angle-to-time transformation may also be performed at the time of reading and writing to the iteration array v[k'] and at the time of reading from an array w[k'] of reference values. In this case, the remaining computations can be carried out in the time domain and the abovementioned parameter transformations can be avoided.

A further alternative to speed up the convergence of a learning controller according to the application is the use of multiple iteration arrays wherein each iteration array corresponds to a different working point of the controlled system. The working point of the controlled system is determined by suitable system parameters, for example by the rotational velocity of the wheel. For a given cycle, a subset of the iteration arrays is selected for reading and also a subset of the iteration arrays is selected for writing. The selections of the subsets depend on the system parameters. The use of a multiplicity of iteration arrays provides an improved starting point for the learning process and can therefore reduce the number of iterations to reach convergence.

In an alternative embodiment, the sampling index k corresponds to a time instead of an angle. In this case, the length of the correction signal v[k] in terms of the sample index k is inversely proportional to the angular velocity of the wheel. To accommodate for this fact, the reading position k of the iteration array v[k] and the reference signal w[k] may be adjusted accordingly. A possible approach is to use the index k*($\omega_{i-1}$/$\omega_i$) instead of the index k as a reading position, where $\omega_i$ is the mean rotation velocity during the i-th rotation period.

From the above it is understood that the controller 16 of FIG. 3 further comprises an input for reading in an actual wheel angle value or an actual value of the rotational wheel velocity, respectively. This is indicated by the double slanted line in FIG. 3. The actual wheel angle value is used by the controller 16 in the various possible ways described above. Prior to further processing, the actual wheel angle value may also be grouped together with a corresponding actual force value which is measured at the same sampling time.

The addition of the reference signal to the output of the iteration memory 82, as shown in FIG. 4, is typical for the serial arrangement of a POISON controller.

In the embodiment of FIG. 5, for reasons of numerical stability, the inverse system controller 130 of the inverting unit 80 is realized as PDL controller without integration component. However, an integration component may be used in the inverse system controller 130, if desired.

Instead of moving average filters, general finite impulse response (FIR) filters may be used for the iteration filter 81 in the filtering unit and the filter 134 in the inverse system unit. The iteration filter 81 may also be arranged between the output 98 of the memory 82 and the input 91 to the adder 90.

There may also be an additional anti-aliasing filter between the input of the control device 23 and the ADC converter 62. Further, the two adders 54 and 100 of FIG. 4 may be combined into a single adder having three inputs.

The POISON controller is especially suitable for the suppression of periodic disturbances of a given frequency and multiples thereof. Therefore, an adjustable comb filter may be used to filter out signal components of the actual torque value signal which are not multiples of the given frequency. For the suppression of wheel generated periodic disturbances, the given frequency corresponds to the wheel rotation frequency. For the suppression of disturbances by the electric motor 20, the given frequency corresponds to the rotation frequency of the electric motor 20.

Additional system identification based on test signals or an initial iteration may be performed preceding to an operation of the steering system 1.

In a further embodiment, a controller according to the application may also comprise a POISON controller and a control unit in a parallel arrangement, as shown later. A controller with the parallel arrangement further comprises a correction signal unit. The correction signal unit derives an external control signal from the correction output signal of the POISON controller and from an internal control signal which is derived from the control unit. In the later embodiments of the parallel arrangement in FIGS. 14 and 15, the correction signal unit corresponds to the adder 54" and the adder 54''', respectively.

In FIG. 15, the control unit corresponds to the adder 83''' and the controller 58'. In FIG. 15, the inverse system unit corresponds to the adder 83' and the inverting unit 80', whereas in FIG. 14 the inverse system unit corresponds to the adder 83", the ADC 62" and the inverting unit 80".

In FIG. 14, the filtering unit corresponds to the adder 90" and an iteration filter which is not shown. This iteration filter could be arranged between the output 98" of the iteration memory 82" and the input 91" of the adder 90". It could also be arranged between the adder 90" and the input 96" of the iteration memory 82".

A method for compensating wheel vibrations according to the application is disclosed. During operation, a control signal is derived from a reference signal, from an actual value signal and from a stored correction signal. The control signal is used for actuating the steering system 1 according to the control signal. In the embodiment of FIG. 1, this is accomplished by sending a control signal to the electric motor 20.

In the serial arrangement of FIG. 4, the reference signal occurs at the input 102 of the adder 100, the actual value signal occurs at the input 55 of the adder 54 and the stored correction signal occurs at the input 99 of the adder 100. In the parallel arrangement of FIG. 15, the reference signal occurs at the input 85' of the adder 83", the actual value signal occurs at a second input 51' of the adder 83" and the stored signal occurs at a second input 53''' of the adder 54'''.

The stored signal is in turn derived from a reference signal, an actual value signal and a previously stored correction signal. In the serial arrangement, as shown in FIG. 4, in an intermediate step, a corrected reference signal is derived from the stored correction signal and the reference signal and, in a further step, the control signal is derived from the corrected reference signal and the actual value signal.

The deriving of the stored correction signal comprises the deriving of a first correction signal. In the embodiment of FIG. 4, this is accomplished by the adder 83 and the inverting unit 80. A further part of the method of the application is the deriving of a second correction signal. In the embodiment of FIG. 4, this is accomplished by the adder 90. Filtering the second correction signal and storing the second correction signal for later use as a stored correction signal is also part of the method of the application. In the embodiment of FIG. 4, this is accomplished by the filtering unit 81 and the iteration memory 82.

The deriving of the first correction signal may further comprise deriving a difference signal from the actual value signal and the reference signal. In the embodiment of FIG. 4, this is accomplished by the adder 83. The deriving of the first correction signal may also comprise the computation of a derivative of the difference signal and the computation of a weighted sum of the difference signal and the derivative of the difference signal. In the embodiment of FIG. 5, this is accomplished by the proportional (P) component and the derivative (D) component of the PDL controller 130. In FIG. 6, these steps are accomplished by the multiplier 151, the differentiator 156 and the adder 154.

The deriving of the control signal from the corrected reference signal and the actual value signal may further comprise the computation of an integral and of a derivative of the corrected reference signal and the computation of a weighted sum from the derivative and the integral of the corrected reference signal and the corrected reference signal. In the embodiment of FIG. 7, this is accomplished by the PID controller 58. In FIG. 6, these steps are accomplished by the multiplier 151, the differentiator 156, the integrator 158 and the adder 154. In place of a PID controller a PD controller without integration component may also be used and the PD or PID controller may also comprise a lag component, as shown in FIG. 6.

As a further step, the deriving of the control signal may also comprise deriving a position signal from a position sensor at the steering wheel and deriving a second control signal from torque of the steering wheel. The second control signal is then used for actuating the electric motor 20. In the embodiment of FIG. 8, the position signal for indicating steering wheel rotation angle occurs at the input 191 of the adder 190 and the control signal occurs at the input 185 of the output limiter 186.

The method may also comprise phase compensation steps. The phase compensation may be used in conjunction with any unit that uses past values of an input signal for the computation of an output signal and thereby introduces a phase lag. In the embodiment of FIG. 5, the phase compensation is accomplished by the backshift elements 139 and 136. The phase compensation of the backshift elements 139 and 136 is accomplished by a cyclic backshift operation which is explained in connection with the operation.

During the first loop of the operation, the stored correction signal is taken from initial values. As shown in connection with FIG. 9, there are several possibilities to generate such initial values.

An update of the stored correction signal may take place each time when a new sample of an actual value signal is generated. The correction signal may also be derived from several signal values at a time, from several signal values of one rotation cycle or even from signal values of multiple cycles. In other words, instead of using an input signal of one cycle only, a new value can be computed from input signals of multiple cycles. In the latter case, a trend over multiple cycles of the correction signal may be derived to speed up convergence. It is also possible to calculate several values of the control signal in one computation step, in order to cope with high wheel rotation speeds.

The steering system 1 according to the application comprises at least one controlled system which has at least one actuator, at least one force sensor and at least one angle sensor. The steering system 1 also comprises at least one controller. For example in the embodiment of FIG. 1, the at least one torque actuator corresponds to the electric motor 20, the at least one force sensor corresponds to the torque sensor 19 and the at least one angle sensor corresponds to the angle sensor 30. The at least one angle sensor is provided at the wheel. This is understood to be any suitable place at the wheel or parts of the drive train which is suitable for obtaining a wheel rotation angle. The at least one torque sensor is provided at the steering shaft which is any position at the steering shaft that is suitable for obtaining a torque on the steering shaft. The at least one actuator can be provided by any device which is capable to receive a control signal and to generate a corresponding steering motion by application of a force.

In an alternative embodiment, multiple POISON controllers can be used for controlling the electric motor 20 of the steering system 1. This embodiment is advantageous for the suppression of periodic disturbances from different sources, which have unrelated frequencies. For example, a second POISON controller may me be used to suppress a torque ripple which is produced by the electric motor 20. In this case, the actual value signal to the second POISON controller is an actual rotation speed of the electric motor 20 and the reference signal is a desired rotation speed of the electric motor 20.

In FIGS. 12-15, components with similar functions have the same reference numbers as the components in the aforementioned figures and prime symbols have been added to demonstrate this.

Figure 12:
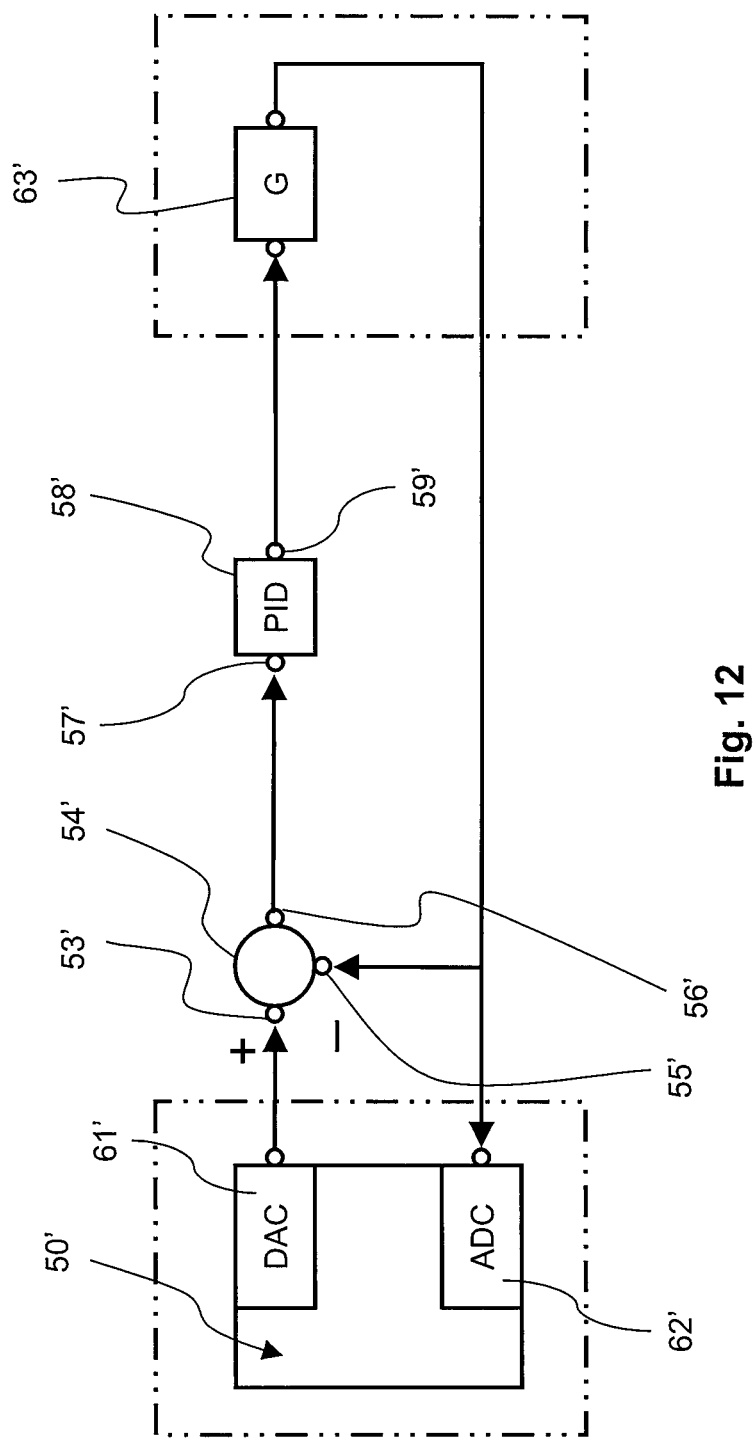
FIG. 12 illustrates a further embodiment of a controller for the power steering system of FIG. 1 comprising an analog controller.

FIG. 12 shows a further embodiment in which the POISON controller 50 of FIG. 3 is realized on a separate digital controller which controls a control loop with an analog adder 54' and an analog PID controller. Like parts have been given like reference numbers. The embodiment of FIG. 12 can be used in the steering system of FIG. 1.

Referring now back to FIG. 4, in the embodiment of FIG. 12 the output 52 of the adder 102 is connected to an input channel 60 of a DAC 61'. The input to the adder 83 is connected to an output channel of an ADC 62'. The adder 54 and the system controller 58 are not part of a POISON controller. They 54, 58 are realized as separate analog components 54', 58'.

In FIG. 12, a first input 53' to an analog adder 54' is connected to an output channel of the DAC 61'. A second input 55' to the analog adder 54' is connected to the controlled system 63'. An output 56' of the analog adder 54' is connected to an input 57' to an analog system controller 58'. An output of the analog system controller 58' is connected to an input the controlled system 63'.

Similar to FIG. 3, there is an adder 54' and a system controller 58' for the controlled system. The components inside the control device 23, which are shown in FIG. 4, are realized for the controlled system 63', as in FIG. 3. The same applies to the corresponding connections.

FIG. 13 shows a further embodiment of a controller according to the application. As in FIG. 12, the POISON controller 50" is realized as a digital controller. FIG. 13 uses an analog system controller 58" instead of the PID controller 58' of FIG. 12. The controller 58" of FIG. 13 represents any type of analog controller. The parts between the adder 83' and the adder 100' of FIG. 13 are similar to the parts between the adder 83 and the adder 100 of FIG. 4. Unlike in FIG. 4, there is no iteration filter in FIG. 13 and the inverting unit 80 of FIG. 4 is replaced by a general digital filter 80'. The output value of the general digital filter 80' is given by a sum of a linear combination of present and past values of the input values of the general digital filter 80' and a linear combination of present and past values of the output signal of the general digital filter 80'.

FIG. 12 and FIG. 13 show two further embodiments of a controller according to the application. Unlike in the previously shown embodiments the POISON controller is used in a parallel arrangement. In the parallel arrangement, the correction signal is added to the output signal of a system controller and not to the input signal. In a serial arrangement, as in FIG. 4, the correction signal is added to the input signal of a system controller 58. The parallel arrangement is easier to implement if the system controller is part of a digital controller, as in FIG. 15, because in this case it is not necessary to insert an analog adder between the system controller and the controlled system. The serial arrangement of FIG. 4 has the advantage over the parallel arrangement of FIG. 14 and FIG. 15 that it can be used with an existing controller 58 without the need to reconfigure the existing controller 58.

In the parallel arrangement of FIG. 14 an adder 54" is provided for adding the stored correction signal to the output of the controller 58".

FIG. 15 shows a further embodiment of a controller according to the application which is similar to the embodiment shown in FIG. 14, but in which the controller 58' is a part of a digital controller 16'''.

The controllers 16", 16' of FIG. 14 or FIG. 15 may also comprise an iteration filter between the adder 90", 90' and the input 96", 96' of the iteration memory 82", 82' or between the output 98", 98''' of the iteration memory 82", 82' and the adder 90", 90'''.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practice. Thus, the scope of the embodiments should be determined by the claims and their equivalents, rather than by the examples given. Moreover, while at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A power steering system, comprising:
   a force actuator for acting upon a part of a steering assembly according to a force control signal;
   at least one position sensor for deriving an actual angle signal of a wheel of a vehicle;
   at least one force sensor for deriving an actual force value signal of a force at a part of the steering assembly; and
   a control device for receiving the actual angle signal and the actual force value signal, for computing the force control signal, for outputting the force control signal to the force actuator, the control device comprising:
   a control unit for computing the force control signal from a force reference signal, from the actual force value signal of the at least one force sensor, from the actual angle signal of the at least one position sensor and from a stored force correction signal;
   an inverting unit for providing a first force correction signal from a difference between the actual force value signal and the force reference signal;
   a filtering unit for providing a second force correction signal from a sum of the first force correction signal and the stored force correction signal; and
   an iteration memory for storing an angle shifted second force correction signal as the stored force correction signal for later use.

2. The power steering system of claim 1, wherein the at least one force sensor is an at least one acceleration sensor.

3. The power steering system according to claim 1, wherein the control unit comprises a correction signal unit for computing a corrected force reference signal from the force reference signal and from the stored force correction signal, and wherein the control unit comprises a controller for computing the force control signal from the corrected force reference signal and from the actual force value signal.

4. A power steering system, comprising:
   a force actuator for acting upon a part of a steering assembly according to a force control signal;
   at least one position sensor for deriving an actual angle signal of a wheel of a vehicle;
   at least one force sensor for deriving an actual force value signal of a force at a part of the steering assembly; and
   a control device for receiving the actual angle signal and the actual force value signal, for computing the force control signal, for outputting the force control signal to the force actuator, the control device comprising:
   a control unit for computing the force control signal from a force reference signal, from the actual force value signal of the at least one force sensor, from the actual angle signal of the at least one position sensor and from a stored force correction signal;
   an inverting unit for providing a first force correction signal from a difference between the actual force value signal and the force reference signal;
   a filtering unit for providing a second force correction signal from a sum of the first force correction signal and the stored force correction signal; and
   an iteration memory for storing an angle shifted second force correction signal as the stored force correction signal for later use;
   wherein the control unit comprises a controller for computing an internal force control signal from the force reference signal and from the actual force value signal, and wherein the control unit further comprises a adder for adding the force control signal from the stored force correction signal and from the internal force control signal.

5. A vehicle having a power steering system, the power steering system comprising:
   at least one force actuator for actuating a part of a steering assembly according to a force control signal;
   at least one wheel position sensor for deriving an actual angle signal;
   at least one force sensor at a part of the steering assembly for deriving an actual force value signal;
   a controller for receiving the actual angle signal and the actual force value signal and for deriving the force control signal and outputting the force control signal to the at least one force actuator, the controller comprising:

a control unit for deriving the force control signal from a reference signal, from the actual angle signal, from the actual force value signal and from a stored correction signal;

an inverting unit for providing a first correction signal from a difference between the actual force value signal and the reference signal;

a filtering unit for providing a second correction signal from a sum of the first correction signal and the stored correction signal; and an iteration memory for storing an angle shifted second correction signal as the stored correction signal for later use.

6. The vehicle with the power steering system of claim 5, wherein the at least one force sensor is an at least one acceleration sensor.

7. A method comprising the steps of:

providing a force actuator at a part of a steering assembly;

computing a force control signal from a reference signal, from an actual force value signal of a force sensor at a steering shaft of the steering assembly of a vehicle, from an actual angle signal of a sensor and from a stored correction signal;

actuating the force actuator according to the force control signal;

providing a first correction signal based upon a difference of the actual force value signal and the reference signal;

computing a sum of the first correction signal and the stored correction signal;

filtering the sum of the first correction signal and the stored correction signal to provide a second correction signal;

storing a phase adjusted second correction signal as the stored correction signal for later use.

8. The method according to claim 7, wherein computing the force control signal comprises: computing the force control signal from the reference signal, from the actual force value signal of an acceleration sensor at a steering rack of the steering assembly the vehicle, from the actual angle signal of the position sensor and from the stored correction signal.

9. The method according to claim 7, further comprising the step of deriving of a corrected reference signal by adding the reference signal to the stored correction signal, wherein the force control signal is derived from the corrected reference signal and from the actual force value signal.

10. The method according to claim 7, wherein the filtering of the sum of the first correction signal and the stored correction signal to provide the second correction signal comprises filtering with a low pass filter.

11. A method comprising the steps of:

providing a force actuator at a steering shaft of a steering assembly;

deriving a force control signal from a reference signal, from an actual force value signal of a force sensor at the steering shaft of the steering assembly and from a stored correction signal;

actuating the force actuator according to the force control signal;

transforming the actual force value signal from a time domain signal into an angle domain signal to provide an angle domain actual force value signal;

deriving a first correction signal from a difference between the angle domain actual force value signal and from the reference signal;

deriving a second correction signal from the first correction signal and from the stored correction signal;

filtering the second correction signal; and storing a phase adjusted second correction signal as the stored correction signal for later use.

12. The method of claim 11, wherein computing the force control signal comprises: computing the force control signal from the reference signal, from the angle domain actual force value signal of an acceleration sensor at a steering rack of the steering assembly the vehicle, from an actual angle signal of a wheel position sensor and from the stored correction signal.

13. The method according to claim 11, further comprising the step of deriving of a corrected reference signal from the reference signal and from the stored correction signal, wherein the force control signal is derived from the corrected reference signal and from the angle domain actual force value signal.

14. The method according to claim 11 further comprising the step of deriving the reference signal by low pass filtering of the actual force value signal.

* * * * *